United States Patent
Schrafel et al.

(10) Patent No.: US 12,145,456 B2
(45) Date of Patent: *Nov. 19, 2024

(54) MODULAR MAGNETIC FLUX CONTROL

(71) Applicant: InductEV, Inc., King of Prussia, PA (US)

(72) Inventors: Peter C. Schrafel, Ithaca, NY (US); Francis J. McMahon, Malvern, PA (US); Matthew L. Ward, Exton, PA (US)

(73) Assignee: InductEV, Inc., King of Prussia, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/131,250

(22) Filed: Apr. 5, 2023

(65) Prior Publication Data

US 2023/0249559 A1 Aug. 10, 2023

Related U.S. Application Data

(62) Division of application No. 17/207,257, filed on Mar. 19, 2021.

(51) Int. Cl.
*B60L 53/122* (2019.01)
*B60L 53/126* (2019.01)
*B60L 53/66* (2019.01)

(52) U.S. Cl.
CPC .......... *B60L 53/122* (2019.02); *B60L 53/126* (2019.02); *B60L 53/66* (2019.02)

(58) Field of Classification Search
CPC .... B60L 53/12–126; B60L 53/39; H02J 7/10; H02J 7/12
See application file for complete search history.

(56) References Cited

U.S. PATENT DOCUMENTS 645,576 A 3/1900 Tesla
649,621 A 5/1900 Tesla
(Continued)

FOREIGN PATENT DOCUMENTS

DE 102012216660 A1 3/2014
JP H09213378 A 8/1997
WO 2015037690 A1 3/2015

OTHER PUBLICATIONS

International Search Report received in Patent Cooperation Treaty Application No. PCT/US2022/011868, dated Jun. 10, 2022.
(Continued)

*Primary Examiner* — David V Henze-Gongola
(74) *Attorney, Agent, or Firm* — Michael P. Dunnam; Culhane Meadows PLLC

(57) ABSTRACT

Modular coil assemblies for wireless charging of vehicles have coil geometries and communications designed to limit electromagnetic field (EMF) levels in regions where humans or other living objects may be present. The modular coil assemblies are designed with the ability to shape the magnetic field to be predominately within shielding provided by the auto chassis by, for example, providing side-by-side phase cancellation or diagonal versus front-to-back (for 1×3, 2×3 array configurations) phase cancellation. The power levels and frequency offset pairwise compensation of the respective coils may be controlled to improve cancellation and thus to reduce magnetic field exposure potential. The phase cancellation of the magnetic flux density from respective coil assemblies varies over a range to provide, for example, −50% cancellation at 125° offset and up to −100% cancellation at 180°. Charging profiles for vehicles and charging stations may be used to maximize the magnetic flux density cancellation during charging.

32 Claims, 25 Drawing Sheets

(56) References Cited

U.S. PATENT DOCUMENTS

| | | | |
|---|---|---|---|
| 787,412 A | 4/1905 | Tesla | |
| 8,698,350 B2 | 4/2014 | Kanno | |
| 8,934,857 B2 | 1/2015 | Low et al. | |
| 9,306,635 B2 | 4/2016 | Kurs et al. | |
| 9,889,757 B2 | 2/2018 | Obayashi et al. | |
| 2010/0181843 A1* | 7/2010 | Schatz | H03H 7/40 |
| | | | 307/104 |
| 2011/0184842 A1* | 7/2011 | Melen | B60L 53/39 |
| | | | 320/108 |
| 2011/0278940 A1 | 11/2011 | Krishna et al. | |
| 2011/0315496 A1* | 12/2011 | Bohori | B60L 53/12 |
| | | | 191/10 |
| 2012/0086281 A1 | 4/2012 | Kanno | |
| 2012/0262002 A1 | 10/2012 | Widmer et al. | |
| 2016/0013661 A1 | 1/2016 | Kurs et al. | |
| 2016/0087477 A1 | 3/2016 | Jeong et al. | |
| 2016/0254697 A1* | 9/2016 | Tanaka | H02J 7/02 |
| | | | 191/2 |
| 2016/0297305 A1 | 10/2016 | Ichikawa | |
| 2019/0039470 A1* | 2/2019 | Moghe | B60L 53/39 |
| 2019/0097447 A1 | 3/2019 | Partovi | |
| 2019/0140481 A1* | 5/2019 | Keeling | H02J 50/005 |
| 2020/0021147 A1 | 1/2020 | Shijo | |
| 2020/0328628 A1 | 10/2020 | Stingu et al. | |

OTHER PUBLICATIONS

Wen, Feng et al., "Human Exposure to Electromagnetic Fields from Parallel Wireless Power Transfer Systems," International Journal of Environmental Research and Public Health, vol. 14, Issue 2, Article 157, Feb. 8, 2017, 15 pages. doi: 10.3390/ijerph14020157.

Zhang, Bo et al., "Challenges of Future High Power Wireless Power Transfer for Light-Duty Electric Vehicles—Technology and Risk Management," eTransportation, vol. 2, Nov. 2019, Elservier, Idaho Falls, Idaho, 19 pages.

Extended Search Report received in European Application No. 23215826.2, mailed Apr. 17, 2024, 9 pages.

* cited by examiner

MODULAR MAGNETIC FLUX CONTROL

CROSS-REFERENCE TO RELATED APPLICATIONS

The present application is a divisional of U.S. patent application Ser. No. 17/207,257, filed Mar. 19, 2021, entitled "Modular Magnetic Flux Control." The contents of that patent application are incorporated herein by reference.

TECHNICAL FIELD

This patent application describes a wireless power transfer coil system that performs wireless charging through use of magnetic induction. The wireless power transfer coil system includes a modular coil assembly that allows for control of total magnetic flux produced.

BACKGROUND

Wireless Power Transfer (WPT) makes use of magnetic induction in an air core transformer. Electrical power is sent from the sending apparatus to the receiving apparatus by means of magnetic flux linkage between the primary (transmitting) and secondary (receiving) coils as stated in Faraday's Law of magnetic induction.

Wireless power transmission via magnetic induction was introduced in the 19th century but failed commercially due to a misunderstanding of the atmosphere's ability to form electrically conductive channels suitable for long-range power transmission. An open-air transformer for wireless power transfer was patented by Nikola Tesla in an "Apparatus for transmission of electrical energy," U.S. Patent No, 649,621, issued May 15, 1900, and in a "System of transmission of electrical energy," U.S. Pat. No. 645,576, issued Mar. 20, 1900.

In recent years, wireless power transmission via magnetic induction has been used to charge electrical appliances and, more recently, to charge electric vehicles. Precise control of the magnetic flux is desirable for efficient power transfer and for minimization of magnetic flux leakage to the surrounding environment. For example, as described in U.S. Pat. No. 8,934,857, parasitic antennas have been used approximate the transmit antenna to selectively modify a distribution of the generated field of a wireless power transmitter by, for example, expanding a coverage area of a small transmit antenna or concentrating a field of a large transmit antenna.

SUMMARY

Various examples are now described to introduce a selection of concepts in a simplified form that are further described below in the Detailed Description. The Summary is not intended to be used to limit the scope of the claimed subject matter.

In sample embodiments, a coil array is provided that includes an n×m array of coil assemblies, where $n \geq 1$ and $m \geq 2$, arranged in a rectilinear x-y grid pattern. Each coil assembly generates a charging signal at a frequency that is out-of-phase with a charging signal of a neighboring coil assembly during a charging session whereby a charging signal transmitted by a coil assembly destructively interferes with a charging signal transmitted by the neighboring coil assembly to reduce additive magnetic flux density during charging as compared to additive magnetic flux density where the neighboring coil assembly is in-phase during charging. The coil array may be mounted in the ground and further include a communication device associated with the coil array that receives setup parameters from a communication device associated with a vehicle to be charged. A charging site server may provide charging parameters of the coil array using the setup parameters. Application of the charging parameters to the coil array may cause generation of additive magnetic flux density during charging that is predominately within an exclusion zone for the vehicle.

Each coil assembly may be driven by a different power source and each coil assembly may transmit a charging signal having a determined amplitude. The charging signal transmitted by the coil assembly may be approximately 180° out of phase with the charging signal transmitted by the neighboring coil assembly to provide the destructive interference. In sample embodiments, each coil assembly may generate a charging signal at the frequency where the charging signal is between 25° and 180° out-of-phase with a charging signal of an adjacent coil assembly during a charging session while still yielding advantageous results.

In sample configurations of the coil array, where $n=2$ and $m=2$, the coil array may comprise a first pair of coil assemblies disposed adjacent each other and a second pair of coil assemblies disposed adjacent each other and in parallel with the first pair of coil assemblies. The first and second pairs of coil assemblies may be powered by respective first and second power sources or each coil assembly may be powered by a separate power source. Each of the first and second pairs of coil assemblies may share a same transmission frequency and power level but with a set phase difference between the coil assemblies in each pair of coil assemblies to provide the desired destructive interference.

In other configurations of the coil array, where $n=2$ and $m=2$, the coil array may comprise a first pair of coil assemblies disposed diagonally from each other and a second pair of coil assemblies disposed diagonally from each other and side-by-side in the x-y directions with the first pair of coil assemblies. The first and second pairs of coil assemblies may be powered by respective first and second power sources or each coil assembly may be powered by a separate power source. The first pair of coil assemblies may share a first frequency and power level and the second pair of coil assemblies may share a second frequency and power level, the first and second frequencies being different, whereby each coil assembly has a set phase difference with adjacent coil assemblies in the x-y directions during charging.

In still other configurations of the coil array, where $n=2$ and $m=2$, the coil array may comprise a first pair of coil assemblies disposed side-by-side with each other and a second pair of coil assemblies disposed side-by-side with each other and in parallel with the first pair of coil assemblies. The first and second pairs of coil assemblies may be powered by respective first and second power sources or each coil assembly may be powered by a separate power source. The first pair of coil assemblies may share a first frequency and power level and the second pair of coil assemblies may share a second frequency and power level, the first and second frequencies being different, whereby each coil assembly has a set phase difference with adjacent coil assemblies in the x-y directions during charging.

In further configurations of the coil array, where $n=1$ and $m=3$, the coil array may comprise respective first, second and third coil assemblies in a row. The first and third coil assemblies may output first charging signals having a first frequency, phase, and power level. The second coil assembly may be disposed between the first and third coil assemblies and configured to output a second charging signal having the first frequency and power level but the second charging signal is out-of-phase with the first charging signal.

In yet further configurations of the coil array, where n=1 and m=3, the coil array may comprise respective first, second and third coil assemblies in a row. The first and third coil assemblies may output first charging signals having a first frequency, first phase, and first power level. The second coil assembly may be disposed between the first and third coil assemblies and configured to output a second charging signal having the first frequency but the second charging signal is out-of-phase with the first charging signal and has a second power level that is different from the first power level that is set so as to reduce the additive magnetic flux density as compared to an additive magnetic flux density where the first, second, and third coil assemblies output charging signals having a same power level. Advantageously, the first and second power levels may be adjusted to shape the additive magnetic flux density during charging to remain predominately within an exclusion zone for the vehicle.

In sample embodiments, the first and second power levels may be set so a region where a maximum magnetic flux cancellation between the first and second charging signals occurs on a curve that is a function of a current ratio between the first and third coil assemblies versus the second coil assembly and a proportion of magnetic flux density canceled when the first and third coil assemblies carry current that is approximately 180° out of phase with a current carried by the second coil assembly. The first and second power levels may be set to approximate a point where a minimum magnetic flux cancellation between the first and second charging signals is maximized.

In yet another configuration of the coil array, where n=2 and m=3, the coil array may comprise a first pair of coil assemblies disposed adjacent each other, a second pair of coil assemblies disposed adjacent each other, and a third pair of coil assemblies disposed adjacent each other. Each pair of coil assemblies may be in parallel with each other and output first charging signals having a first frequency. Each pair of coil assemblies may be powered by respective first and second power sources or each coil assembly in each pair may be powered by a separate power source. A coil assembly of each pair of coil assemblies may output a charging signal having a set phase difference with an adjacent coil assembly in the x-y directions during charging to provide the desired destructive interference.

In a further configuration of the coil array, where n=2 and m=3, the coil array may comprise a first pair of coil assemblies disposed adjacent each other, a second pair of coil assemblies disposed adjacent each other, and a third pair of coil assemblies disposed adjacent each other. Each pair of coil assemblies may be in parallel with each other and output first charging signals having a first frequency. Each pair of coil assemblies may be powered by respective first and second power sources or each coil assembly in each pair may be powered by a separate power source. A first coil assembly in each pair of coil assemblies may have a set phase difference with a second coil assembly of each pair of coil assemblies whereby a coil assembly of each pair of coil assemblies outputs a charging signal having a same phase as a charging signal output by an adjacent coil assembly of an adjacent pair of coil assemblies.

In other sample embodiments, a wireless power transfer system is provided that includes a vehicle coil array and a ground coil array. The vehicle coil array may include an n×m array of vehicle coil assemblies, where n≥1 and m≥2, arranged in a rectilinear x-y grid pattern. Each vehicle coil assembly may receive a charging signal at a frequency that is out-of-phase with a charging signal of an adjacent vehicle coil assembly during a charging session whereby a charging signal received by each vehicle coil assembly destructively interferes with a charging signal received by an adjacent vehicle coil assembly in the x-y directions so as to reduce additive magnetic flux density during charging as compared to additive magnetic flux density where the adjacent vehicle coil assemblies in the x-y directions are in-phase during charging. Similarly, the ground coil array may comprise an r×s array of coil assemblies, where r≥n and s≥m, arranged in a rectilinear x-y grid pattern. Each ground coil assembly may generate the charging signal at the frequency whereby the charging signal is out-of-phase with the charging signal of an adjacent ground coil assembly during a charging session and whereby the charging signal generated by each ground coil assembly destructively interferes with the charging signal generated by an adjacent ground coil assembly in the x-y directions so as to reduce additive magnetic flux density during charging as compared to additive magnetic flux density where the adjacent ground coil assemblies in the x-y directions are in-phase during charging.

In sample embodiments of the wireless power transfer system, the ground coil array may detect when a vehicle coil assembly is inoperative and activate only the ground coil assemblies aligning with operative vehicle coil assemblies to send charging signals. A data repository may also be provided that is accessible by the vehicle coil array and/or the ground coil array during a charging session to access a charging profile of default and historical measurements for each vehicle coil assembly. The charging profile may include frequency response and charging models for setting charging parameters during the charging session.

In the sample embodiments of the wireless power transfer system, the charging profile may include vehicle coil assembly frequency offset; make, model, and manufacturer of the ground coil assembly; a number of vehicle coil assemblies; positioning of the vehicle coil assemblies; minimum and maximum current and voltage support of the vehicle coil assembly; health status of the vehicle coil assemblies; temperature limitations of the vehicle coil assemblies; temperature readings of vehicle coil assemblies; and/or cooling availability for the vehicle coil assemblies. The ground coil array also may obtain a number and placement of vehicle coil assemblies of a vehicle to be charged from the charging profile for the vehicle to be charged and select, for sending charging signals, a pattern of ground coil assemblies from the r×s array of coil assemblies corresponding to the number and placement of the vehicle coil assemblies for the vehicle to be charged.

In other sample embodiments of the wireless power transfer system, the data repository may further store charging parameters for the ground coil assembly including magnetic signal characteristics for each ground coil assembly or pair of ground coil assemblies based on an aligned vehicle coil assembly or pair of vehicle coil assemblies. The charging parameters for the ground coil assembly may include instantaneous power level during a charging session, charging signal frequency, frequency drift, signal phase offset, and/or nominal coil-to-coil gap. The charging parameters for the ground coil assembly also may include power availability; environmental factors; and/or ground coil assembly conditions including internal temperature, usage, number of coils per ground coil assembly, number of turns per ground coil assembly, and/or whether the ground coil assembly is surface mounted or flush mounted. The charging parameters for the ground coil assembly may further include make, model, and manufacturer of the ground coil assembly; autonomous alignment capability of the ground coil assembly; minimum and maximum current and voltage support of the ground coil assembly; communications protocols available to the ground coil assembly; and/or a communications bandwidth of the ground coil assembly.

In further sample embodiments, a wireless power transfer system is provided that includes a vehicle coil array and a ground coil array where the vehicle coil array transmits energy to the ground coil array. The vehicle coil array includes an n×m array of vehicle coil assemblies, where n≥1 and m≥2, arranged in a rectilinear x-y grid pattern. Each vehicle coil assembly may generate a charging signal at a frequency whereby the charging signal is out-of-phase with a charging signal of an adjacent vehicle coil assembly during a charging session and whereby a charging signal generated by each vehicle coil assembly destructively interferes with the charging signal generated by an adjacent vehicle coil assembly in the x-y directions so as to reduce additive magnetic flux density during charging as compared to additive magnetic flux density where the adjacent vehicle coil assemblies in the x-y directions are in-phase during charging. The ground coil array may include an r×s array of ground coil assemblies, where r≥n and s≥m, arranged in a congruent rectilinear x-y grid pattern. Each ground coil assembly may receive the charging signal at the frequency whereby the charging signal is out-of-phase with the charging signal of an adjacent ground coil assembly during a charging session and whereby the charging signal received by each ground coil assembly destructively interferes with the charging signal received by an adjacent ground coil assembly in the x-y directions so as to reduce additive magnetic flux density during charging as compared to additive magnetic flux density where the adjacent ground coil assemblies in the x-y directions are in-phase during charging.

In another sample embodiment of a wireless power transfer system, the vehicle coil array is larger than the ground coil array. This embodiment includes a ground coil array comprising an n×m array of ground coil assemblies, where n≥1 and m≥2, arranged in a rectilinear x-y grid pattern. Each ground coil assembly may generate a charging signal at a frequency whereby the charging signal is out-of-phase with a charging signal of an adjacent ground coil assembly during a charging session and whereby a charging signal generated by each ground coil assembly destructively interferes with the charging signal generated by an adjacent ground coil assembly in the x-y directions so as to reduce additive magnetic flux density during charging as compared to additive magnetic flux density where the adjacent ground coil assemblies in the x-y directions are in-phase during charging. The vehicle coil array may comprise an r×s array of vehicle coil assemblies, where r≥n and s≥m, arranged in a rectilinear x-y grid pattern. Each vehicle coil assembly may receive the charging signal at the frequency whereby the charging signal is out-of-phase with the charging signal of an adjacent vehicle coil assembly during a charging session and whereby the charging signal received by each vehicle coil assembly destructively interferes with the charging signal received by an adjacent vehicle coil assembly in the x-y directions so as to reduce additive magnetic flux density during charging as compared to additive magnetic flux density where the adjacent vehicle coil assemblies in the x-y directions are in-phase during charging.

An electric vehicle charging system is also provided that includes a plurality of coil arrays where each coil array comprises at least one coil assembly that generates a charging signal at a set frequency. At least one sensor is also provided to measure aggregate magnetic flux generated by charging signals generated by the coil arrays. Means are also provided for identifying an additive hot spot of magnetic flux densities and for adjusting power, phase, and/or frequency offsets of at least one of the coil arrays in a vicinity of the additive hot spot of magnetic flux densities to reduce magnetic flux densities at the additive hot spot of magnetic flux densities.

Methods of charging an electric vehicle are also described whereby a charging point and the electric vehicle initiate communications with each other and the charging point receives setup data from the electric vehicle for setting up the charging point for charging of the electric vehicle. The setup data may include a manufacturer of the electric vehicle, a model of the electric vehicle, and/or an exclusion zone. The charging point then activates the ground primary coils and associated power levels for the activated ground primary coils based on the setup data to create a charging signal having a magnetic flux density that does not extend beyond the exclusion zone. For example, the manufacturer or model of the electric vehicle may be used to look up in a database which ground primary coils to activate and power levels for the activated ground primary coils. The charging point may activate the ground primary coils according to a determined layout of the secondary coils of the electric vehicle as determined from the received setup data. The charging point may further adjust parameters of the charging signal based on the setup data as needed to fit a magnetic flux generated by the charging signal within the exclusion zone.

In sample embodiments, the charging point and the electric vehicle may initiate communications with each other by the charging point emitting an inductive communications beacon while in a standby state and receiving a response from the electric vehicle to establish that the electric vehicle is approaching the charging point.

This summary section is provided to introduce aspects of the inventive subject matter in a simplified form, with further explanation of the inventive subject matter following in the text of the detailed description. The particular combination and order of elements listed in this summary section is not intended to provide limitation to the elements of the claimed subject matter. Rather, it will be understood that this section provides summarized examples of some of the embodiments described in the Detailed Description below.

BRIEF DESCRIPTION OF THE DRAWINGS

The foregoing and other beneficial features and advantages of the invention will become apparent from the following detailed description in connection with the attached figures, of which.

DETAILED DESCRIPTION

Figure 1:
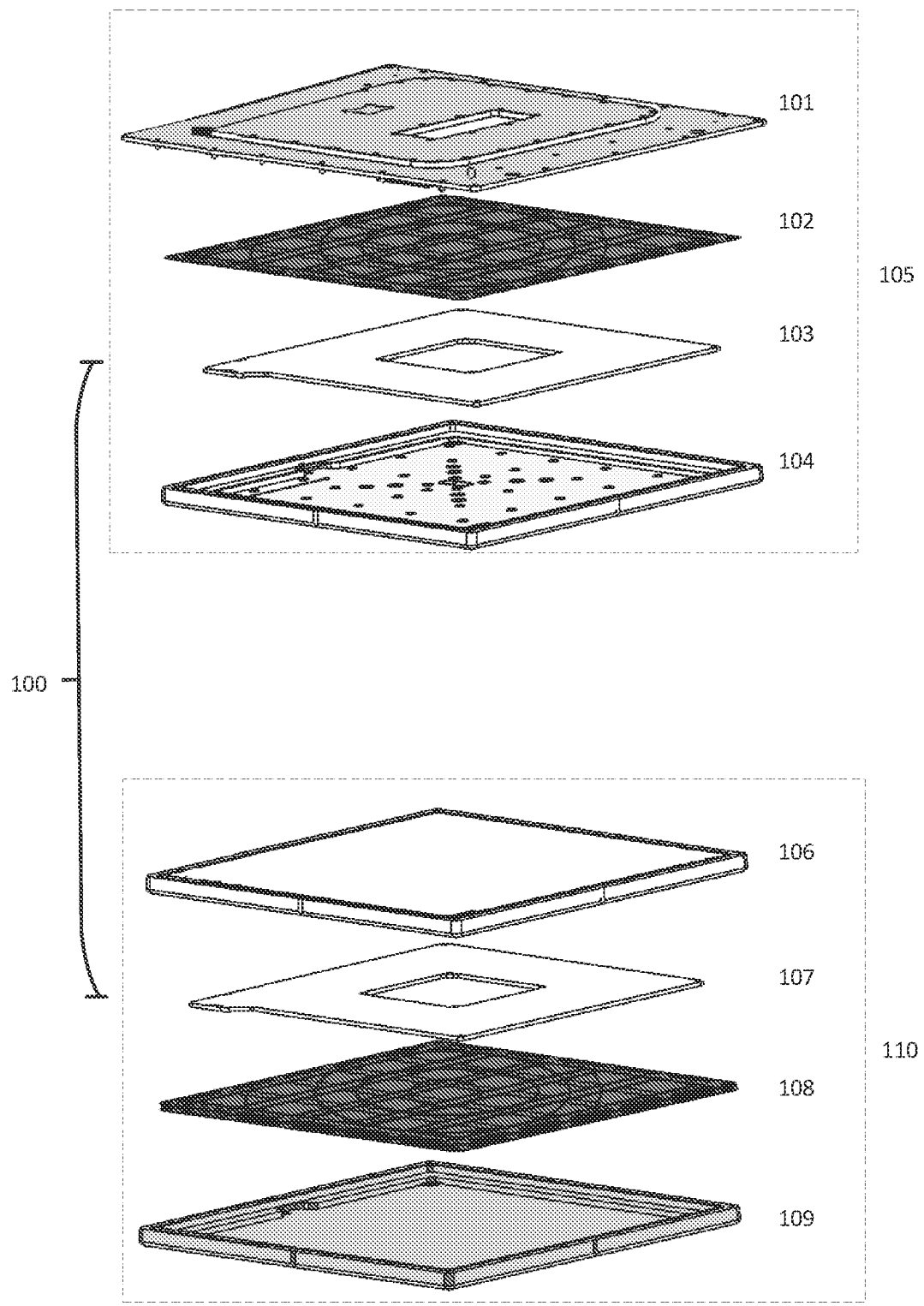
FIG. 1 illustrates the high-level component design of a conventional secondary coil assembly and primary coil assembly.

Embodiments of the wireless power transfer coil system and associated method described herein may be understood more readily by reference to the following detailed description taken in connection with the accompanying figures and examples that form a part of this disclosure. It is to be understood that this description is not limited to the specific products, methods, conditions, or parameters described and/or shown herein, and that the terminology used herein is for the purpose of describing particular embodiments by way of example only and is not intended to be limiting of any claimed subject matter. Similarly, any description as to a possible mechanism or mode of action or reason for improvement is meant to be illustrative only, and the subject matter described herein is not to be constrained by the correctness or incorrectness of any such suggested mechanism or mode of action or reason for improvement. Throughout this text, it is recognized that the descriptions refer both to methods and systems/software for implementing such methods.

A detailed description of illustrative embodiments will now be described with reference to FIGS. 1-18. Although this description provides a detailed description of possible implementations, it should be noted that these details are intended to be exemplary and in no way delimit the scope of the inventive subject matter. Note that the term "battery" is used herein to depict a generic chemical energy storage system and could be replaced, supplemented, or hybridized with other portable energy storage systems (e.g., solid-state batteries, reversable fuel cells, ultra-capacitors). Also, while many of the examples used are of a wireless power transfer (WPT) system used to power the onboard systems and charge the batteries of a stationary electric vehicle (EV), this use is by no means the only use contemplated.

The ability to transfer power over a magnetic link between a paired conductive primary and secondary conductive coils is well-known. Such systems are commonly known as Wireless Power Transfer (WPT) systems. A modular WPT based on symmetric coils deployed in clusters has been found to provide advantages in manufacturability, deployment flexibility, dynamic provisioning, and high-power transfer efficiency.

Magnetic flux produced by the coil pair of an open-core transformer based wireless power transfer system scales with transmitted power level. In high power systems, magnetic flux can create electromagnetic noise and exceed human exposure limits. As high-power charging is needed by the electric vehicle market to minimize charging times, techniques for managing the magnetic flux are desired.

All air core transformer-based WPT systems produce magnetic flux that extends beyond the immediate vicinity of the WPT system. Most (>95%) of the energy associated with this flux is recirculated into the capacitance of the WPT transformer circuit each alternating current cycle. Most (>99%) of the energy that is not recirculated becomes thermal energy in magnetic, dielectric, and conductive materials in and around the coils. A small percentage of the energy is radiated and the radiofrequency (RF) electromagnetic waves associated with this energy are a form of non-ionizing radiation (NIR). The energy transfer indicates that the vast majority of magnetic flux passes between the magnetic coils and that this area (Zone 1) exceeds human and electronics exposure limits. The near-field magnetic flux density outside the coil perimeters but inside the periphery of the electric vehicle (i.e., in the Exclusion Zone or Zone 2) may exceed human and/or electronics exposure limits. Outside the Exclusion Zone delineation (Zone 3), the total magnetic flux density realized decreases monotonically outside the set threshold.

The measurable magnetic flux occurs predominately within Zones 1 and 2, that is within the exclusion zone delineation. Outside the exclusion zone, only magnetic flux density below a threshold is allowable. The exclusion zone threshold may be set through legal or regulatory bodies, by the decision of the operator, or by the limits of human perception of magnetic effects.

For electromagnetically short antennas, such as the primary coil of a WPT system, the near field (reactive) range is defined as distance from the antenna 0 to $\lambda/2\pi$, where $\lambda$ is wavelength. With an exemplary 85 kHz WPT system, this means that the near field range is over 561 meters in range and the magnetic field strength and magnetic field power drop at rates of $1/(r^3)$ and $1/(r^6)$, respectively, (where r=radius) for the magnetic charging signal in the near field. The magnetic field strength (H-field, measured in amps per meter) is equal to the magnetic flux density (B-field, measured in teslas) times a proportionality constant in the linear magnetic materials and in nonmagnetic materials (like air, fiberglass, vacuum etc.)

The recirculating flux that stores the inductive energy of the system and mediates the power transfer is not radiation but may be present in areas where humans can be exposed to it. Guidelines for human exposure to these RF electromagnetic fields (EMFs) may be found in the Institute of Electrical and Electronics Engineers document C95.1-2019—IEEE Standard for Safety Levels with Respect to Human Exposure to Electric, Magnetic, and Electromagnetic Fields, 0 Hz-to-300 GHz and in the International Commission on Non-Ionizing Radiation Protection (IC-NIRP) document entitled GUIDELINES FOR LIMITING EXPOSURE TO ELECTROMAGNETICFIELDS (100 KHZ-TO-300 GHZ).

It is in both the manufacturer's and user's interests to reduce RF EMFs produced by WPT systems to allow for higher system power throughput while ensuring compliance with exposure guidelines. Since lower coil-to-coil efficiency is associated with correspondingly increased levels of un-recirculated magnetic flux, it is in the manufacturer's and user's interests to minimize un-recirculated magnetic flux regardless of exposure guidelines.

Both active and passive magnetic field reduction methods are well known in the art. Active systems, such as the Helmholtz coil and Maxwell coil, are well-known examples where auxiliary coils are used to create constant field volumes where external magnetic fields can be suppressed.

Passive magnetic shielding uses ferromagnetic materials with high relative permeability and a high saturation point to channel magnetic flux or diamagnetic materials to shift flux. Examples of these materials may be found in ASTM A753-08(2013); "Standard Specification for Wrought Nickel-Iron Soft Magnetic Alloys" and MIL-N-14411 Revision C, Nov. 23, 1977; "NICKEL-IRON ALLOY, HIGH MAGNETIC PERMEABILITY, SHEET, STRIP, AND WIRE".

However, both the active and passive approaches have been found to have deficiencies for use in a wireless power transfer system beyond the efficacy to suppress undesired magnetic flux. For example, the active approach may require installation of additional magnetic structures (e.g. windings, radiators, loop(s)) which then need to be powered to generate the cancellation signal of the correct amplitude, frequency, and phase. One example of this active, parasitic approach can be found in U.S. Pat. No. 9,306,635. In many active cases, one or more magnetically sensitive antennas will be necessary to create a feedback control loop. The active control system, due to the powered parasitic cancellation loops, will necessarily lower power transfer efficiency of the WPT system. On the other hand, the passive system suffers from both the initial cost of materials, installation and deployment and the ongoing cost for the maintenance of the contrivance needed to mechanically maneuver the shielding into place prior to and after each wireless charging session.

A coordinated magnetic flux reduction system and method in a sample embodiment does not require parasitic loops nor movement of shielding material, raising the power efficiency, and removing the need for moving parts. The coordinated magnetic flux reduction system described herein does not require fielding of additional equipment beyond the wireless power transfer apparatus. As will be understood by those skilled in the art, a coordinated magnetic flux reduction system may require a modular primary coil construction with two or more co-deployed primary coil assemblies serving matching secondary coil assemblies.

In the coordinated cancellation approach, deploying power-transferring primary and secondary coils (duos) in clusters with pairing between neighboring duos and adjusting the charging signal voltage, current and phase results in the summed magnetic flux produced by the WPT system to be vastly reduced. There is no need for ancillary, non-power transfer cancellation loops or coils. Supported cluster configurations of coils include, for example, 1-by-2, 2-by-2, 2-by-3 and so on. Unpaired cluster configurations (e.g., 1-by-3, 1-by-5) can also benefit from virtual pairing of neighboring and/or adjacent coils in a cluster where the voltage, current and phase is adjusted for each coil in the cluster.

Clusters may be sized for a particular use (e.g., electric vehicle class—car, light truck, etc.) to allow for dynamic selection primary coils based on matching the size and geometry of the secondary coil cluster. Depending on the ground deployment, the clustering can be dynamically provisioned. In one example, an Electric Vehicle (EV) with a 2-by-1 secondary cluster can be charged by a 3-by-2 ground cluster and take advantage of the phase, voltage, and current controlled power transfer for each the aligned coil pairs to reduce magnetic flux.

Utilizing 2-way communications between the charger and equipment or device to be charged (e.g. as in U.S. Pat. No. 10,135,496, entitled "Near field, full duplex data link for use in static and dynamic resonant induction wireless charging") not only allows for communications of near real-time events and status (e.g. battery charge level), but also allows exchange of information between the vehicle controller (e.g., a battery management system (BMS)) and the charging station (e.g., the charging station controller that tasks each GA and each GA cluster) about the capabilities for each system.

The contours of constant magnetic flux density shown in FIGS. 4 through 8C herein are dependent on the power transferred between the primary and secondary coil assemblies. For each figure, the global flux density scales linearly with the primary coil current so that changes to the input current to the cluster of primary coil assemblies would contract or expand the contour lines spacing but not change overall the shape of the topographical mapping of contours of flux density. This holds true for each cluster and for each current-phase relationship shown.

FIG. 1

FIG. 1 illustrates in exploded view the major components of a conventional primary and secondary coil assembly duo 100 for the inductively coupled wireless transfer of power.

In an exemplary embodiment, the secondary coil assembly 105 is installed under an electric vehicle (EV) with necessary connections to the vehicle's battery management system (BMS) (not shown). In this embodiment, the secondary coil assembly 105 is attached to the underside of the EV, although other mounting positions are possible.

The EMF shield 101 serves to provide mechanical and electrical power interconnection to the EV while also preventing eddy currents from being induced on the EV's metal components.

The secondary backing core 102, nominally a continuous flat slab or shaped continuous sheet of ferrite material, serves to redirect magnetic flux away from the vehicle. The terms "backing core" and "ferrite" as used to describe materials used to guide magnetic flux and are not meant to limit the selection of such materials. Both terms are used herein as a generic for any a construction of high-permeability magnetic material, with high-permeability meaning a relative permeability substantially larger than 1 (nominally>100). The term ferrite is not meant to preclude this use of other similar or compatible materials that could be used in construction of a backing core and may include layered metallic sheets, powdered oxides, sintered powdered oxides, and/or amorphous metals that can be fabricated into the flat slab or shaped sheet topologies.

The secondary coil 103 is the receiver for the magnetically transferred energy and may comprise a planar spiral of conductors (i.e., windings). The spiral can be either circular or rectangular and is smaller in area or diameter than the backing core 102 and the EMF shield 101. A sample spiral coil configuration is described with respect to FIGS. 7-10 of U.S. patent application Ser. No. 16/615,290, entitled "WIRELESS POWER TRANSFER THIN PROFILE COIL ASSEMBLY," the contents of which are incorporated herein by reference.

The secondary coil assembly cover 104 is a lightweight, magnetically inert housing to protect the electronics from liquid and dust incursions.

In the embodiment of FIG. 1, the primary coil assembly 110 is installed on the surface of pavement or underground to be flush with the pavement's surface.

The primary coil assembly cover 106 is a magnetically inert housing capable of handling heavy loads while preventing liquid and dust incursions into the primary coil assembly 110.

The primary coil 107 is the transmitter for the magnetically transferred energy and may comprise a planar spiral of conductors (i.e., windings). The spiral can be either circular or rectangular. In the interest of minimizing unwanted magnetic flux production, the primary coil 107 and secondary coil 103 are identical in area or diameter but may contain coil windings with a differing number of turns. It is noted that in a bi-directional system the primary coil 107 and the secondary coil 103 can swap duties and directions allowing power to be transmitted from the vehicle to the ground.

The primary backing core 108, nominally a continuous flat slab or shaped continuous sheet of ferrite material, serves to redirect magnetic flux away from the ground and back toward the secondary coil 103.

The ground plate 109 serves to mechanically support the rest of the primary coil assembly. The ground plate may also provide interconnection to electrical ground. Omitted from FIG. 1 are the electrical connectors, structural members, cooling plumbing, and sensors that do not materially affect the magnetic field characteristics.

FIG. 2

Figure 2:
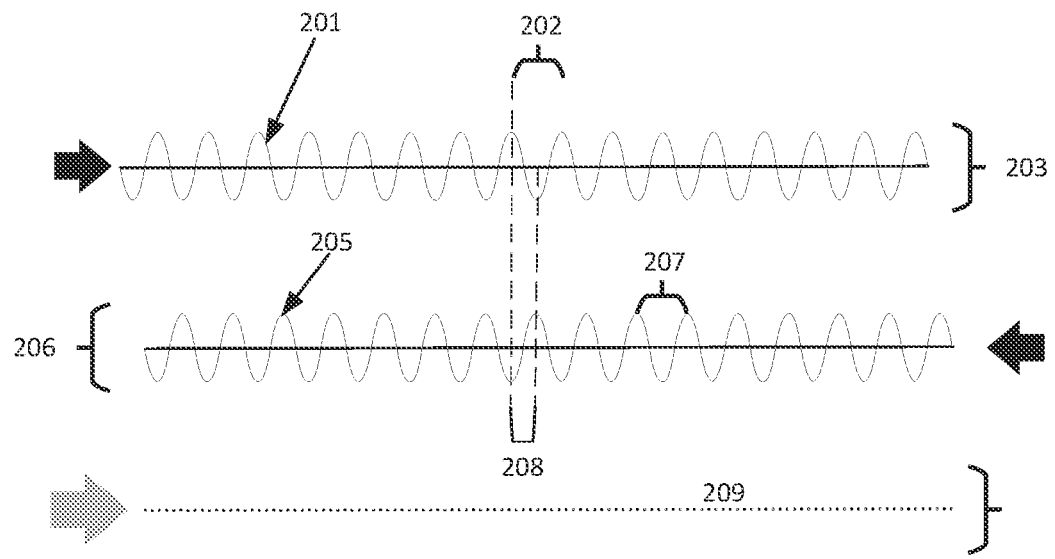
FIG. 2 illustrates the additive destructive cancellation of two sinusoidal signals.

FIG. 2 illustrates an example of the destructive cancellation of paired sinusoids. The first signal 201, plotted by time (X-axis) and amplitude (Y-axis), shows the properties of wavelength 202, amplitude 203, and a phase of zero (0). A second signal 205 is also shown, plotted by time (X-axis) and amplitude (Y-axis). The second signal 205 has an amplitude 206 and a wavelength 207 identical to the first signal 201; however, the phase difference 208 is 180°. When signal 201 and 205 are summed, the resultant signal 209 as shown plotted on a 3rd time (X-axis) and amplitude (Y-axis) coordinate system is nulled by destructive interference due to the 180° phase difference between signals 201 and 205.

FIG. 3A

Figure 3A:
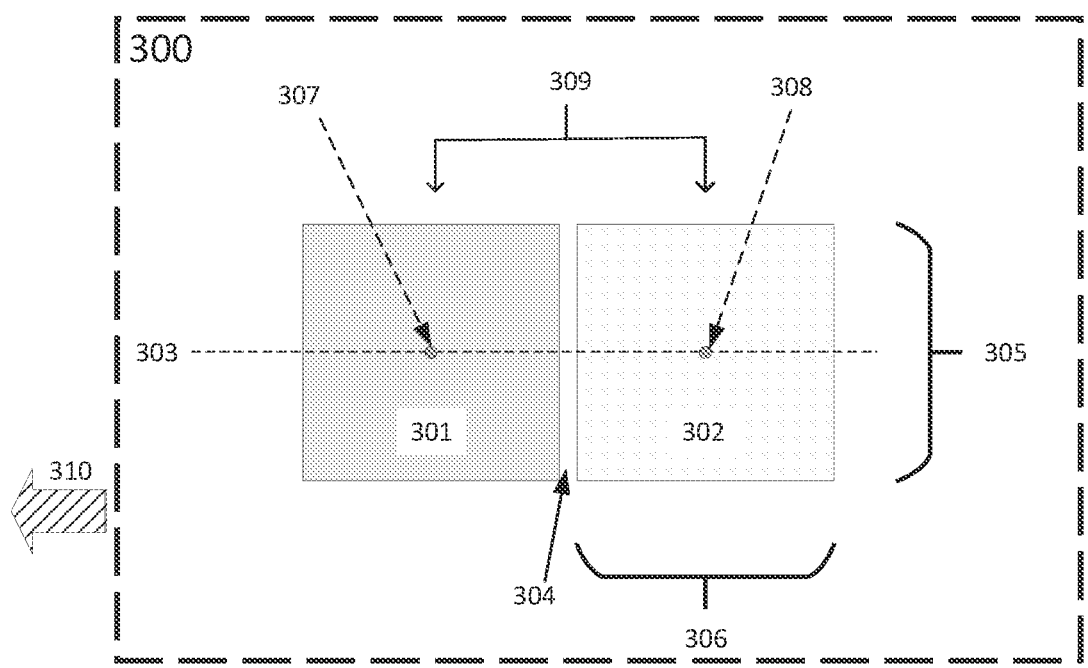
FIG. 3A geometrically illustrates the physical characteristics of an in-line pair of primary coil assemblies in a sample embodiment.

FIG. 3A illustrates the physical characteristics of a paired set 300 of in-line modular primary coil assemblies (also known as a Ground Assembly (GA)). The primary coils can be rectangular (typically square) or elliptical (typically circular) spirals. The first primary coil assembly 301 is emplaced with the adjacent and adjoining second primary coil assembly 302. The adjacent primary coil assemblies 301 and 302 are separated by a gap 304. In this example, the adjacent primary coil assemblies 301 and 302 are identical in length 305 and width 306 and are aligned in-line with the direction of movement 310 of the vehicle to be charged along an axis 303 and rectilinear in relation. The midpoints 307 and 308 (a.k.a. the boresights) of the adjacent primary coil assemblies 301 and 302 are separated by a distance 309.

The gap 304 serves to isolate the individual modular primary coil assemblies 301 and 302 both electrically and magnetically. Since the backing core layer and EMF shield are larger than the coil windings (as shown in FIGS. 7-10 of U.S. patent application Ser. No. 16/615,290, "WIRELESS POWER TRANSFER THIN PROFILE COIL ASSEMBLY"), the gap 304 is a distance between EM shields of neighboring coil assemblies. Magnetic isolation is achieved by sizing the gap 304 to prevent addition (or subtraction by destructive cancellation) of magnetic flux from a first primary coil assembly 301 to the second primary coil assembly 302 as well as from a primary to non-aligned nearby secondary coil assemblies. To create larger clusters based on the in-line configuration, additional secondary assemblies (and corresponding ground-based primary assemblies) may be added to the end of the cluster up to the length of the vehicle chassis, maintaining the requisite separation gap 304 between adjoining secondary assemblies. The front of the in-line cluster is defined as to the left 310 in FIG. 3A in the direction of movement of the vehicle to be charged.

FIG. 3B

Figure 3B:
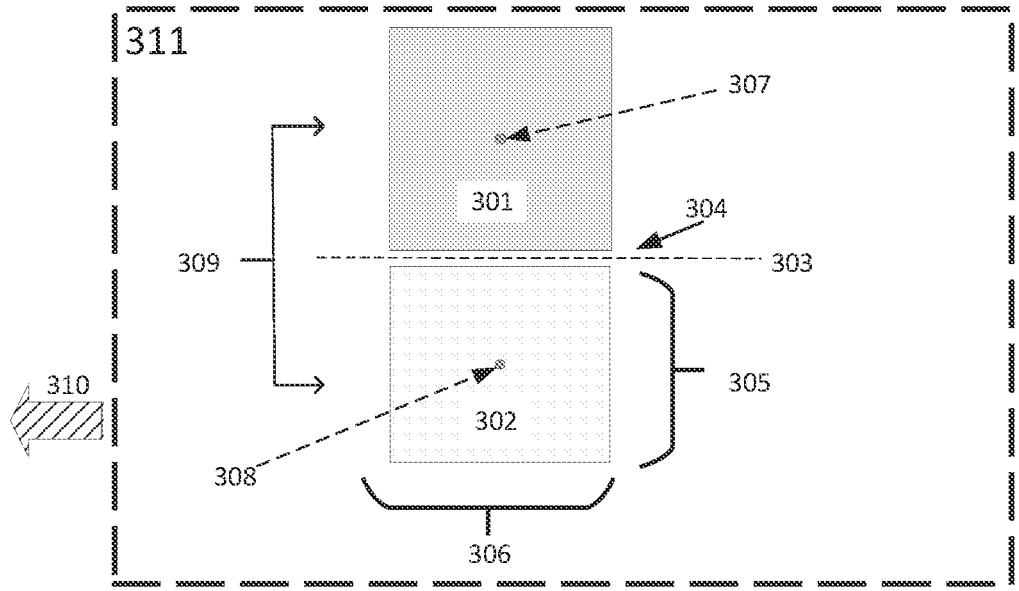
FIG. 3B geometrically illustrates the physical characteristics of a single parallel pair of primary coil assemblies in a sample embodiment.

FIG. 3B geometrically illustrates the physical characteristics of a charge point cluster 311 having a single parallel pair of primary coil assemblies in a sample embodiment. The primary assembly coils can be rectangular (typically square) or elliptical (typical circular) spirals. The first primary coil assembly 301 is emplaced with the adjacent and adjoining second primary coil assembly 302 with both assemblies 301 and 302 symmetrically placed to either side of the vehicle chassis midline 303. The adjacent primary coil assemblies 301 and 302 are separated by a gap 304. In this example, the adjacent primary coil assemblies 301 and 302 are identical in length 305 and width 306 and are aligned along the axis 303 and rectilinear in relation. The midpoints 307 and 308 (a.k.a. the boresights) of the adjacent primary coil assemblies 301 and 302 are separated by a distance 309. The front of the parallel 311 cluster is defined as to the left 310 in FIG. 3B in the direction of movement of the vehicle to be charged.

FIG. 3C

Figure 3C:
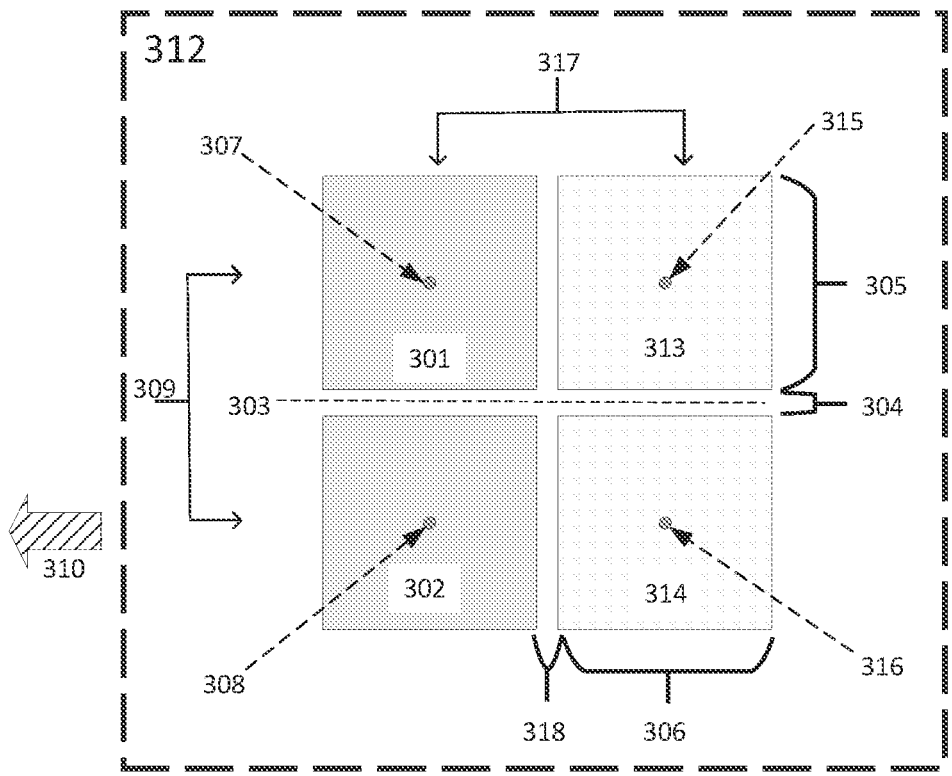
FIG. 3C geometrically illustrates the physical characteristics of parallel pairs of primary coil assemblies in a sample embodiment.

FIG. 3C geometrically illustrates the physical characteristics of a 2×2 cluster 312 of primary coil assemblies with the first pair 301, 302 and second pair 313, 314 arranged in parallel rows with one member of each pair situated to either side of the vehicle chassis centerline 303. The first parallel primary coil assembly pair 301, 302 are separated from each other by a first gap 304. The first parallel primary coil assembly pair 301, 302 have respective boresights 307 and 308 separated by a distance 309. The second parallel primary coil assembly pair 313, 314 are separated from each other by the first gap 304. The second parallel primary coil assembly pair 313, 314 have respective boresights 315, 316 separated by the distance 309. The respective pairs of parallel primary coil assembly pairs are aligned rectilinearly and separated by a second gap 318, whereby the respective boresights 308, 315 and 309, 316 are separated by a second distance 317 left-right in the direction of movement 310 of the vehicle to be charged. The 2×2 cluster 312 can be characterized as 2 side-by-side pairs, 2 diagonal pairs, and even as 2 front-to-back pairs.

Additional, neighboring primary assemblies (2-to-2n) can be installed to extend the modular cluster shown in FIG. 3C by adding pairs in parallel to either side of the vehicle chassis centerline 303. Adjacent primary assemblies are the nearest neighbor or nearest neighbors (all adjoining) in a modular cluster of primary assemblies. Non-adjacent primary assemblies in a modular cluster are defined as neighboring. With the 2×2 (and the larger 2xn, n>2) cluster pairing between primary coil assemblies, it becomes possible to use side-by-side (parallel to either side of the vehicle mid-line), diagonal, or front-to-back (both on the same side of the vehicle midline) cluster pairings.

A cluster of primary assemblies (including single primary assembly or cluster of primary assemblies) may also be called a wireless charge point. A geographically grouped set of wireless charge points under common control is referred to as a wireless charging station. Large groupings of wireless charge points under common control may also defined as wireless charging depots or wireless charging facilities.

A commercially deployed 200 kW system (4 primary coil assemblies at 50 kW each with a center frequency of 20 kHz) had a 101.6 mm separation between neighboring primary coil assemblies. A later, also commercially deployed, 300 kW system (4 primary coil assemblies at 75 kW each with a center frequency of 85 kHz) had a 75 mm separation between neighboring primary coil assemblies. The closer spacing of the primary coil assemblies (and matched secondaries) can be adjusted for mechanical and installation considerations with a minimum spacing maintained to reduce interference in misalignment situations and thus decrease overall sensitivity to misalignment between the primary and secondary coil assembly duos.

When the inductively coupled, wireless power transfer system is active, magnetic flux is produced by alternating current in the primary and secondary coils. In the region surrounding the coils, the distribution of this magnetic flux is very well approximated by the equations for magnetic field of a dipole source located at the magnetic center of each coil. This field has a generally toroidal (donut) shape, with magnetic flux directed in the poloidal direction (looping around through the donut hole). As with any magnetic dipole source, field strength (equivalently flux density) drops off with the cube of distance ($1/r^3$) from the dipole.

In one working 200 kW embodiment, the primary coil assemblies were each 902 mm long and 902 mm wide. In a second working 300 kW embodiment, the primary coil assemblies were each 725 mm long and 675 mm wide.

FIG. 4

Figure 4:
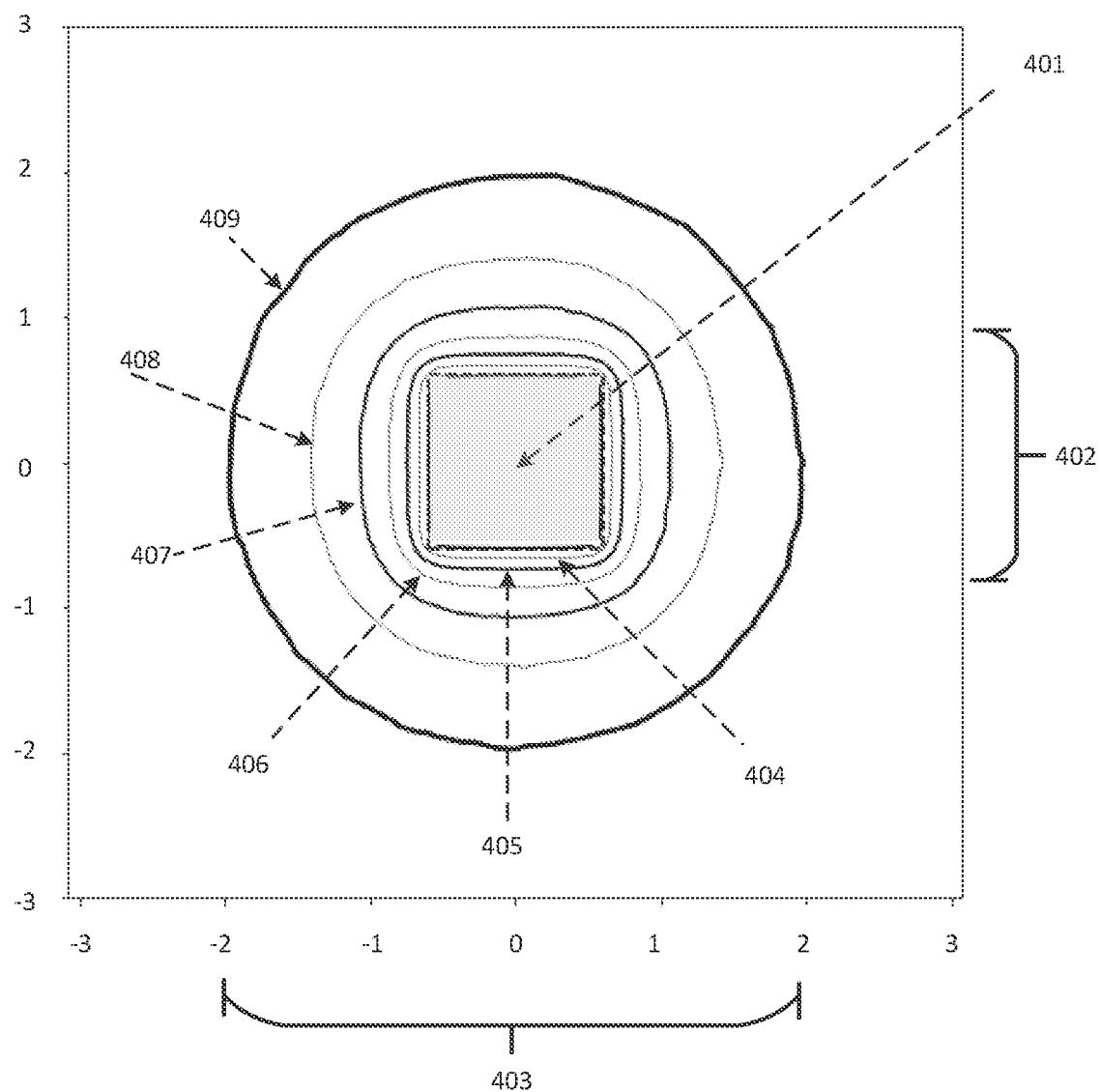
FIG. 4 topographically illustrates the magnetic flux density created by a single primary and secondary coil assembly duo during a charging session.

FIG. 4 illustrates the contours of the constant magnetic flux density created by a single, large primary coil assembly 401 plotted on a Cartesian coordinate system with both axes showing distance (in meters) from the center of the primary coil assembly 401 during a charging session. This is a worst-case model since no shielding from the electrical vehicle body is assumed.

The magnetic fields in FIG. 4 were modeled using finite element method (FEM) calculations to determine the magnetic flux density produced by conductive coils in the presence of other conductive materials (source of eddy currents) and magnetic materials.

When actively transferring power to the secondary coil assembly (not shown), the total magnetic flux density decreases as the distance from the center of the primary coil assembly 401 increases. When actively transferring power to the secondary coil assembly (not shown), the total magnetic flux density decreases as the distance from the center of the primary coil assembly 401 increases. Immediately surrounding the primary coil assembly 401, the first contour line 404 denotes a constant magnetic flux density of 316 µT (microteslas). The second contour line 405 shows the constant magnetic flux density of 100 µT. The third contour 406 shows the constant magnetic flux density of 31.6 µT. The fourth contour 407 shows the constant magnetic flux density of 10 µT. The fifth contour 408 shows the constant magnetic flux density of 3.16 µT. The sixth contour 409 shows the constant magnetic flux density of 1µT.

Recent proposed exposure rules for safe magnetic field exposure limits include those from the independent non-profit group, the International Commission on Non-Ionizing Radiation Protection (ICNIRP) and those from the technical professional engineering and standards association, the Institute of Electrical and Electronics Engineers (IEEE). The United States Federal Communications Commission is investigating if new limitations on magnetic exposure are necessary for Wireless Power Transfer in ET 19-226, "Targeted Changes to the Commission Rules Regarding Human Exposure to Radiofrequency Electromagnetic Fields."

The suggested ICNIRP limit (from "Guidelines for limiting exposure to electromagnetic fields (100 kHz to 300 GHz), Health Phys 118; March 2020") is 27 µT (very close to the 31.6 µT contour), while the relevant IEEE (from: "IEEE C95.1-2019—IEEE Standard for Safety Levels with Respect to Human Exposure to Electric, Magnetic, and Electromagnetic Fields, 0 Hz to 300 GHz") limit is 200 µT (between the 316 µT and 31.6 µT contours) for the nominal 85 kilohertz magnetic charging signal. These contours are all within the typical vehicle width 402 centered around the primary coil assembly 401.

FIG. 5A

Figure 5A:
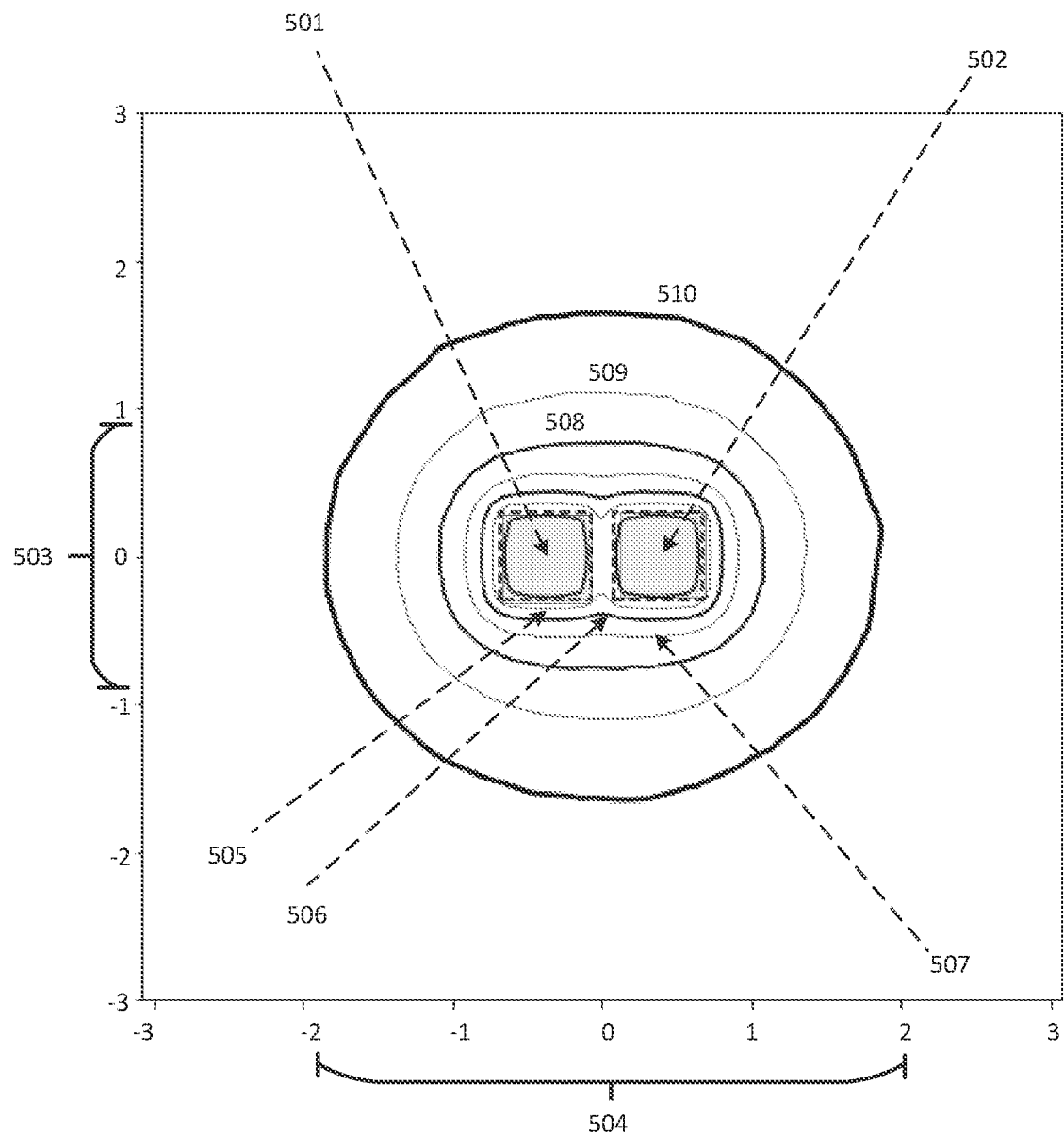
FIG. 5A topographically illustrates the magnetic flux density created by a pair of modular in-line primary and secondary coil assembly duos during an in-phase charging session.

FIG. 5A illustrates the contours of constant magnetic flux density created by a pair of modular in-line primary coil assemblies 501 and 502 plotted on a Cartesian coordinate system with both axes showing distance (in meters) from the center point within the gap between the pair of primary coil assemblies 501 and 502 during an in-phase charging session. In this case, the pair of modular primary coil assemblies 501 and 502 are powered from a common source and emit substantially identical amplitude, frequency, and phased magnetic signals as set by the magnetics controller (not shown). In this example, the modular primary coil assemblies 501 and 502 are placed in a tessellation following a congruent rectilinear grid pattern.

The additive magnetic flux density is shown by contours of constant magnetic flux density. The first contour 505 shows the 316 µT constant magnetic flux density. The second contour 506 shows the 100 µT constant magnetic flux density. The third contour 507 shows the 31.6 µT constant magnetic flux density. The fourth contour 508 shows the 10 µT constant magnetic flux density. The fifth contour 509 shows the 3.16 µT constant magnetic flux density. The sixth contour 510 shows the 1µT constant magnetic flux density.

A nominal width 503 of an automobile (1.8 meters) and a nominal length 504 are drawn for illustration of a specific embodiment. As illustrated, the modular paired primary coil assembly shown in FIG. 5A is well suited for use in automotive charging. By placing the secondary coil assembly(s) on the underside of the vehicle, passengers and bystanders gain both shielding of magnetic flux and an exclusion zone only enterable by crawling under the vehicle. When inactive, magnetic charging signal exists, but low power inductive communications signals may.

The design of cars, trucks, buses, and other road-based vehicles follow a consistent design where the length exceeds the width of the vehicle. Compared to the generally oval pattern of fields (versus the circular fields of a single primary coil assembly (see FIG. 1)), the 1×2 coil assembly of FIG. 5A takes advantage of both additional shielding from the metallic automobile body and the exclusion area provided by the auto body, frame, and wheels.

For every served EV, a set of individual secondary coil assemblies is permanently associated with each vehicle. Information on the frequency response for each secondary coil assembly can be maintained either by the vehicle or at a central (landside) repository. By adjusting the charging frequency for each primary coil assembly in each pair, discrepancies in frequency response (e.g., created by differing manufacturers, makes, models of secondary coil assemblies) can be minimized. Since the pair at the new frequency would still be out-of-phase, substantial cancellation of magnetic flux is realized at the cost of reduced efficiency.

FIG. 5B

Figure 5B:
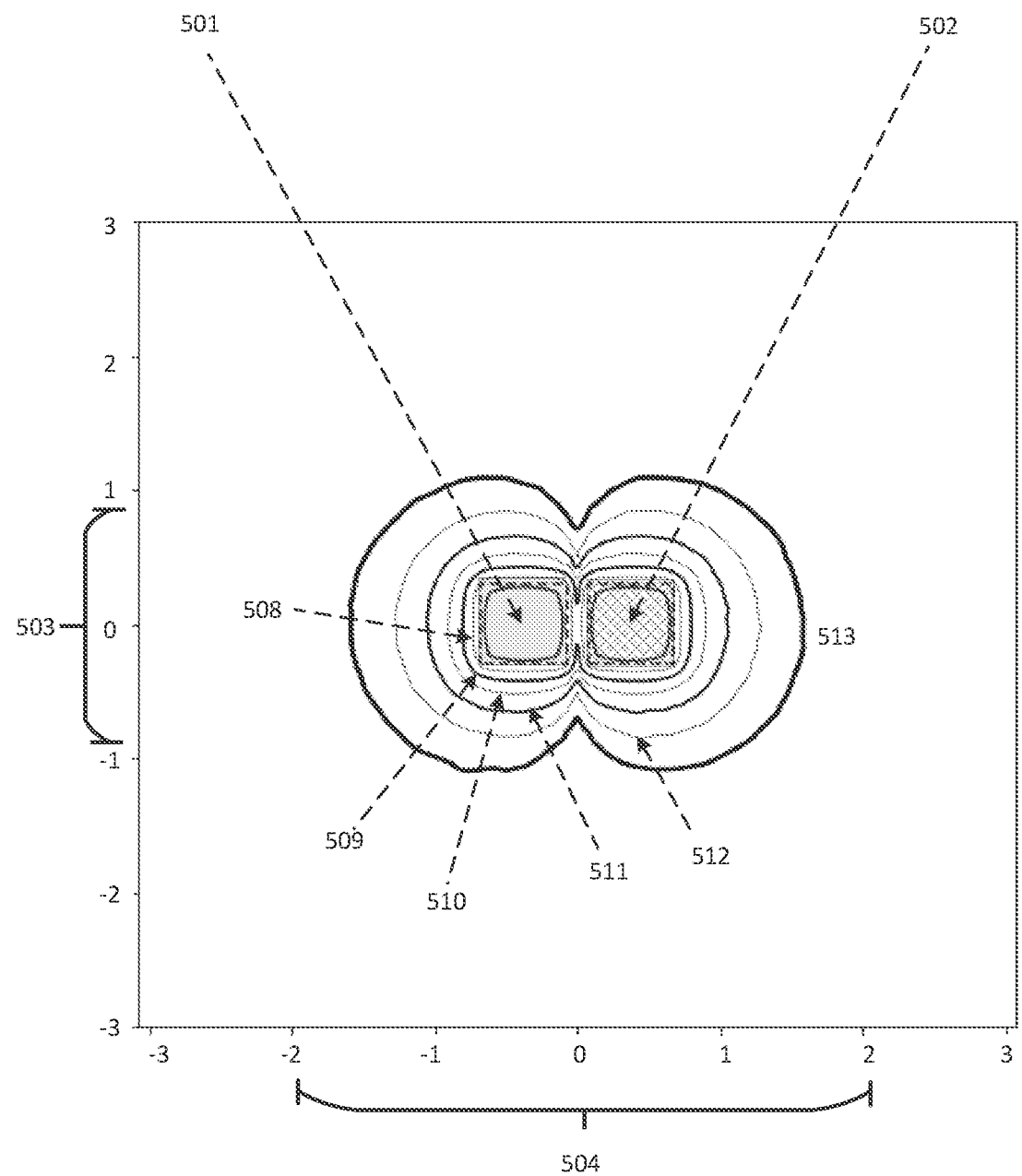
FIG. 5B topographically illustrates the magnetic flux density created by a pair of modular in-line primary and secondary coil assembly duos during an out-of-phase charging session.

FIG. 5B illustrates the contours of constant magnetic flux density created by a pair of modular in-line primary coil assemblies 501 and 502 plotted on a Cartesian coordinate system with both axes showing distance (in meters) from the center point within the gap between the pair of primary coil assemblies 501 and 502 during an out-of-phase charging session. In this example, the modular primary coil assemblies 501 and 502 are placed in a tessellation following a congruent rectilinear grid pattern. In this case, the pair of modular primary coil assemblies 501 and 502 are powered from multiple sources and produce substantially identical magnetic charging signals in terms of determined amplitude and frequency; however, the phase difference between the magnetic charging signals has been set to approximately 180°. As used in this context, "approximately" means±10°.

The resultant additive magnetic flux density for the two charging signals is shown by the contour lines. The first contour 508 shows the 316 µT constant magnetic flux density. The second contour 509 shows the 100 µT constant magnetic flux density. The third contour 510 shows the 31.6 µT constant magnetic flux density. The fourth contour 511 shows the 10 µT constant magnetic flux density. The fifth contour 512 shows the 3.16 µT constant magnetic flux density. The sixth contour 513 shows the 1µT constant magnetic flux density.

A nominal width 503 of an automobile (1.8 meters) and a nominal length 504 are drawn for illustration of a specific embodiment. As illustrated, the modular paired primary coil assembly shown in FIG. 5B is well suited for use in automotive charging. By placing the secondary coil assembly(s) on the underside of the vehicle, passengers and bystanders gain both shielding of magnetic flux and an exclusion zone only enterable by crawling under the vehicle. When inactive, no magnetic charging signal exists.

FIG. 5C

Figure 5C:
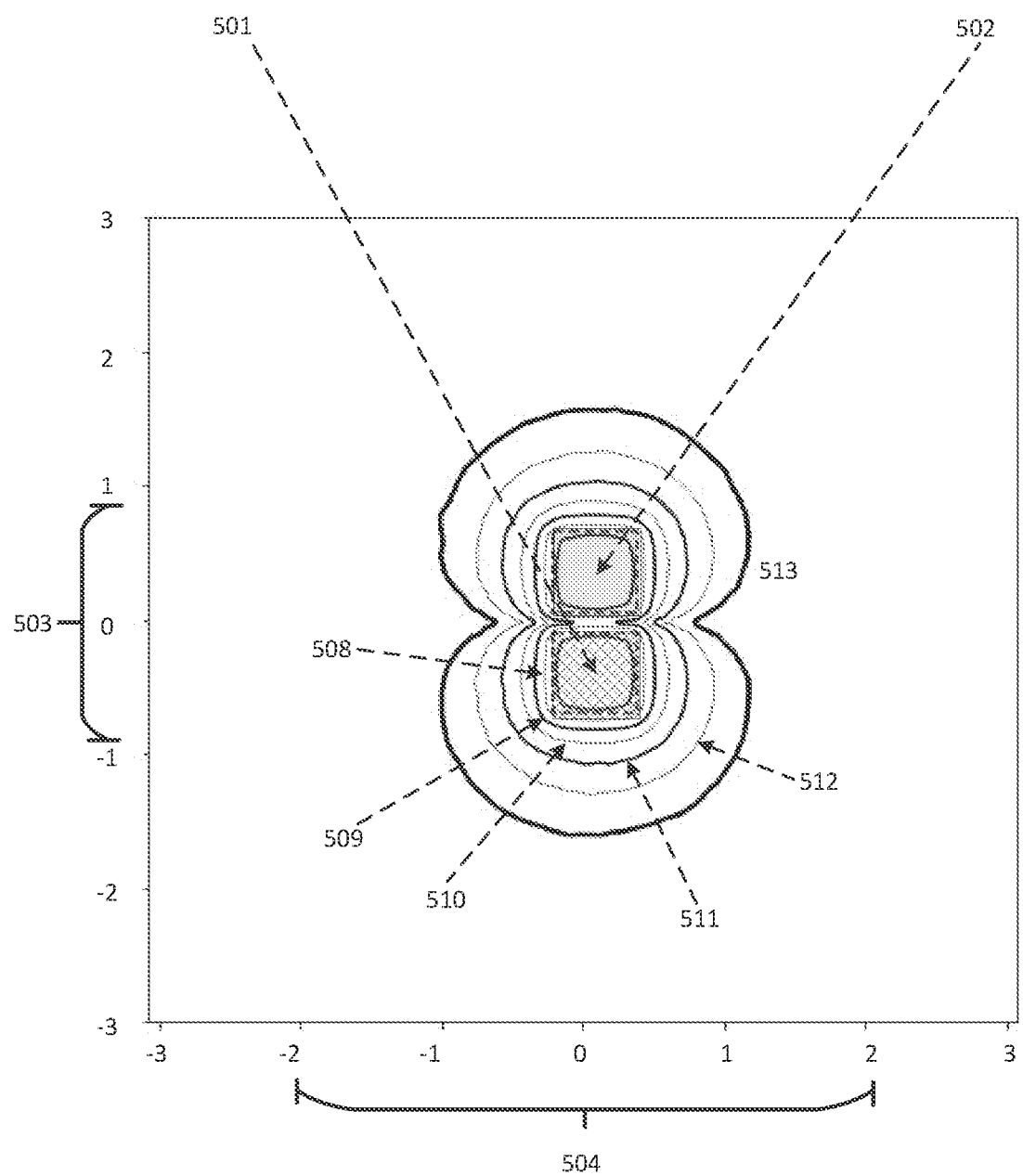
FIG. 5C topographically illustrates the magnetic flux density created by a pair of modular parallel primary and secondary coil assembly duos during an out-of-phase charging session.

FIG. 5C topographically illustrates the contours of constant magnetic flux density created by a side-by-side pair of modular primary coil assemblies 501 and 502 plotted on a Cartesian coordinate system with both axes showing distance (in meters) from the center point within the gap between the pair of primary coil assemblies 501 and 502 during an out-of-phase charging session. In this example, the modular primary coil assemblies 501 and 502 are placed in a tessellation following a congruent rectilinear grid pattern. In this case, the pair of modular primary coil assembly duos 501 and 502 are powered from multiple sources and produce substantially identical magnetic charging signals in terms of determined amplitude and frequency; however, the phase difference between the magnetic charging signals has been set to approximately 180°. The resultant additive magnetic flux density for the two charging signals is shown by the contour lines and is the same as in the embodiment of FIG. 5B except rotated 90 degrees.

The resultant additive magnetic flux density for the two charging signals is shown by the contour lines. The first contour 505 shows the 316 µT constant magnetic flux density. The second contour 506 shows the 100 µT constant magnetic flux density. The third contour 507 shows the 31.6 µT constant magnetic flux density. The fourth contour 507 shows the 31.6 µT constant magnetic flux density. The fifth contour 512 shows the 1µT constant magnetic flux density.

A nominal width 503 of an automobile (1.8 meters) and a nominal length 504 are drawn for illustration of a specific embodiment. As illustrated, the 2×1 side-by-side configuration of modular paired primary coil assembly cluster shown in FIG. 5C is less well suited for use in automotive charging than the 1×2 in-line configuration shown in FIG. 5B due to the larger area of magnetic flux outside the exclusion zone formed by the car chassis (when placing the secondary coil assembly(s) on the underside of the vehicle as in this embodiment).

Since cars, trucks, buses, and other road-based vehicles follow a consistent design where the length exceeds the width of the vehicle and vehicle width is limited by roadway lane width, the geometric shaping of the contours of constant magnetic flux density can better be affected by the additional shielding provided by the metallic automobile body. It is noted that the exclusion area around the primary coil assemblies provided by the auto body, frame, and wheels can further limit potential EMF exposure.

FIG. 6A

Figure 6A:
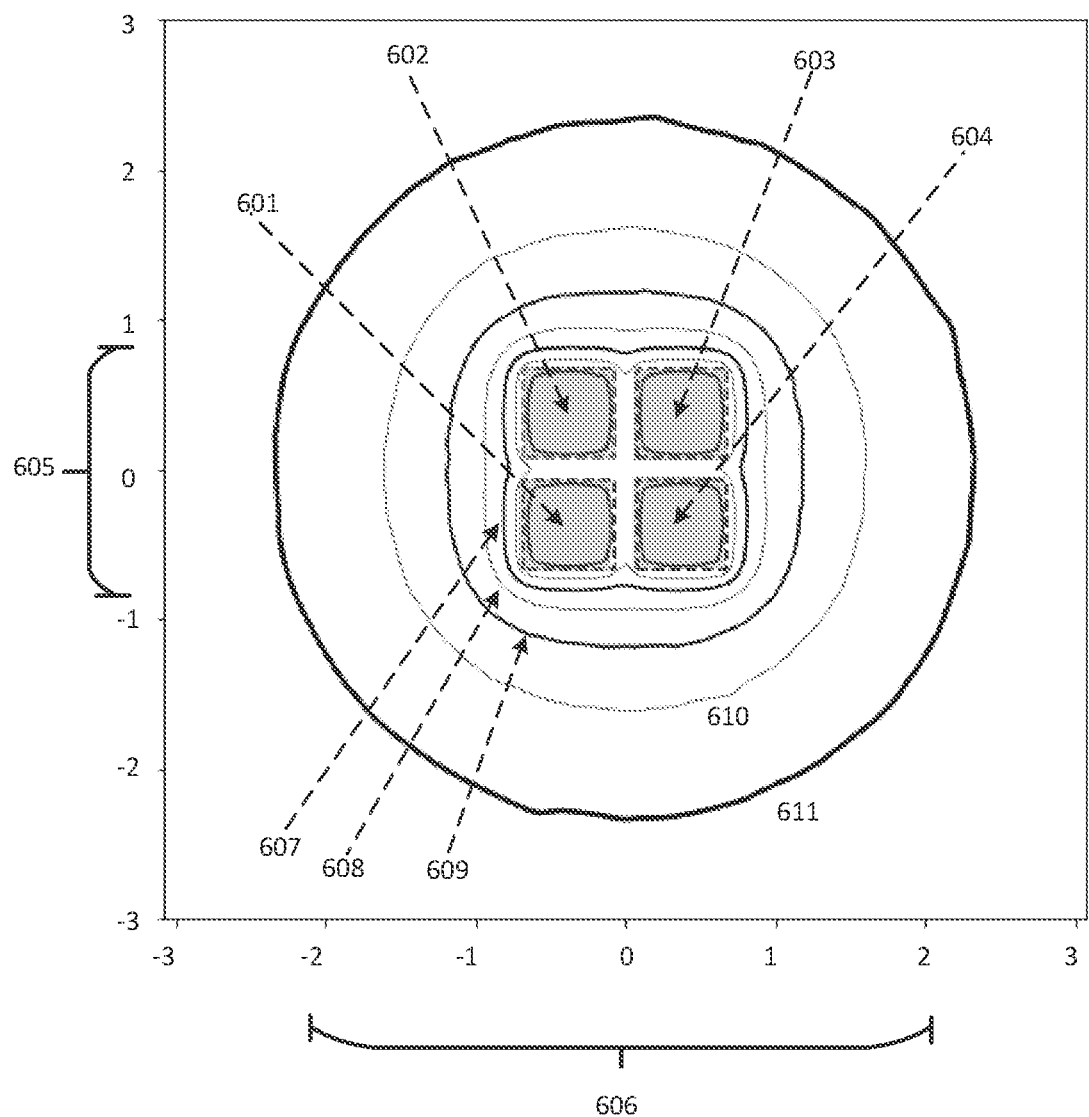
FIG. 6A illustrates the magnetic flux density created by a 2×2 cluster of four modular primary and secondary coil assembly duos during an in-phase charging session.

FIG. 6A illustrates a modular cluster of four primary coil assemblies arranged in a 2×2 cluster. Given the size of the individual primary coil assemblies, this geometric arrangement is well suited for installation under a van, truck, trailer, or bus chassis. In FIG. 6A, each of the primary coil assemblies are powered from a common source and share transmission frequency, phase, and power levels. In this example, the modular primary coil assemblies 601, 602, 603, and 604 are placed in a tessellation following a congruent rectilinear grid pattern.

The additive magnetic flux density during an in-phase charging session is shown by the contours of constant magnetic flux density plotted on a Cartesian coordinate system with the origin placed at the center of the 2×2 cluster of primary coil assemblies. The first contour 607 shows the 100 µT constant magnetic flux density. The second contour 608 shows the 31.6 µT constant magnetic flux density. The third contour 609 shows the 10 µT constant magnetic flux density. The fourth contour 610 shows the 3.16 µT constant magnetic flux density. The fifth contour 611 shows the 1µT constant magnetic flux density.

In terms of human exposure, this scenario with all four primary coil assemblies 601, 602, 603, and 604 transmitting in the same frequency and phase shows the worst case of magnetic flux density. As can be seen from the nominal automobile width 605 and length 606, the 4×4 cluster is unlikely to be installed under an automobile having such dimensions. However, larger vehicles such as a bus (nominal chassis width 2.6 meters) would provide additional overlap and therefore shielding of passengers and bystanders from elevated magnetic flux density.

FIG. 6B

Figure 6B:
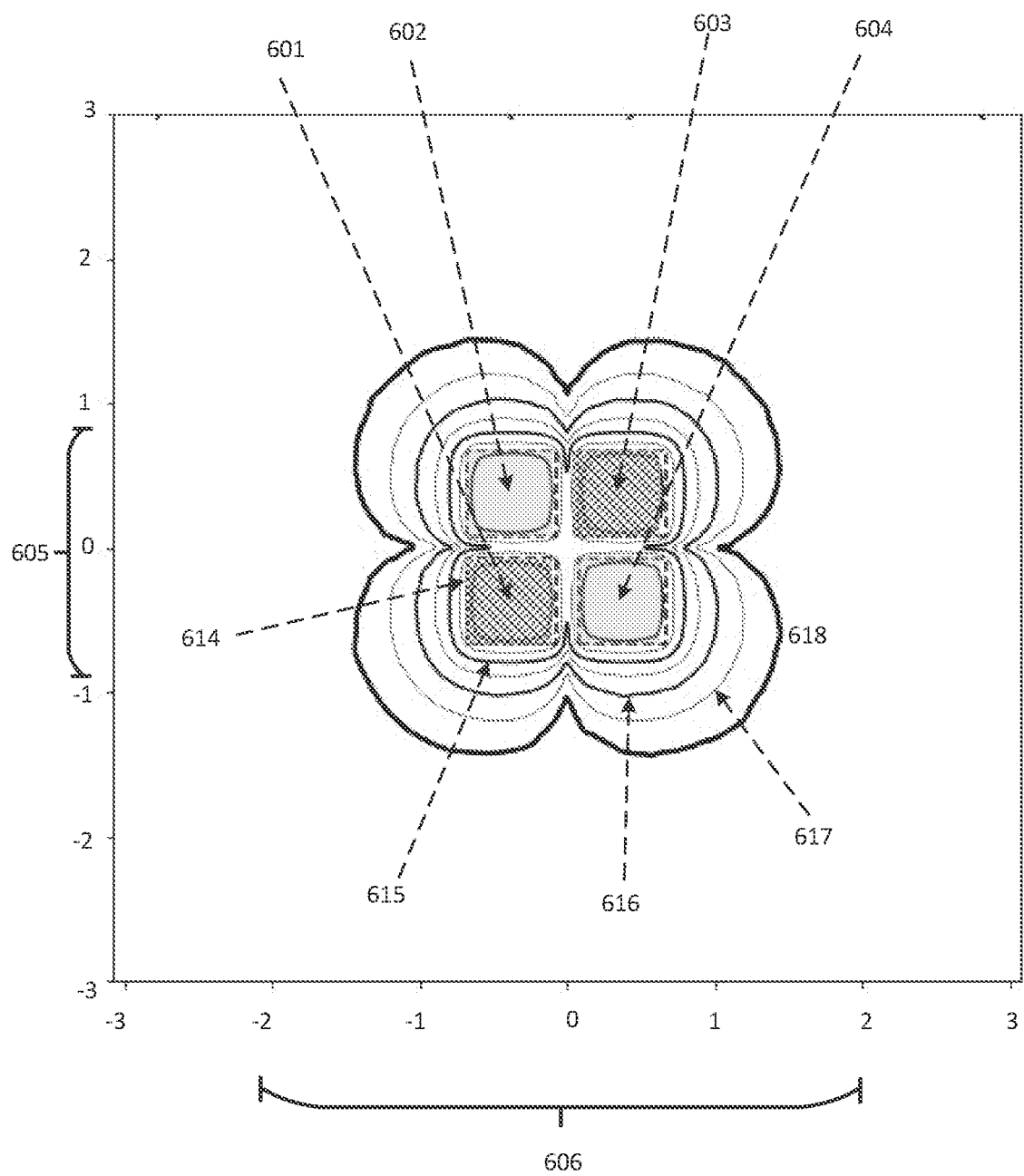
FIG. 6B illustrates the magnetic flux density created by a 2×2 cluster of four modular primary and secondary coil assembly duos paired side-by-side during an out-of-phase charging session. In this configuration, diagonal duos are in-phase and adjacent duos are out-of-phase.

FIG. 6B illustrates a modular cluster of four primary coil assemblies arranged in a 2×2 cluster. In this example, the modular primary coil assemblies 601, 602, 603, and 604 are placed in a tessellation following a congruent rectilinear grid pattern. Also, in this example, the primary coil assemblies are segregated into a first pair 601 and 602 and a second pair 603 and 604 with each pair powered from a separate source or individually powered, but with each pair sharing the same transmission frequency and power levels but with a set phase difference (e.g., 180°) between the side-by-side paired primary coil assemblies.

As discussed previously, the phase difference between paired primary coil assemblies during an out-of-phase charging session results in destructive interference of the transmitted magnetic charging signals. The additive magnetic flux density is shown by the contours of constant magnetic flux density plotted on a Cartesian coordinate system with the origin placed at the center of the 2×2 cluster of primary coil assemblies. The first contour 614 shows the 100 µT constant magnetic flux density. The second contour 615 shows the 31.6 µT constant magnetic flux density. The third contour 616 shows the 10 µT constant magnetic flux density. The fourth contour 617 shows the 3.16 µT constant magnetic flux density. The fifth contour 618 shows the 1 µT constant magnetic flux density.

The resultant shape of the magnetic field (as shown by the 1µT contour 618) is not only reduced in area but also is preferentially lowered to the EV sides where passenger ingress and egress is expected. Larger vehicles such as a bus (nominal chassis width 2.6 meters) would provide additional overlap and therefore shielding of passengers and bystanders from elevated magnetic flux density.

FIG. 6C

Figure 6C:
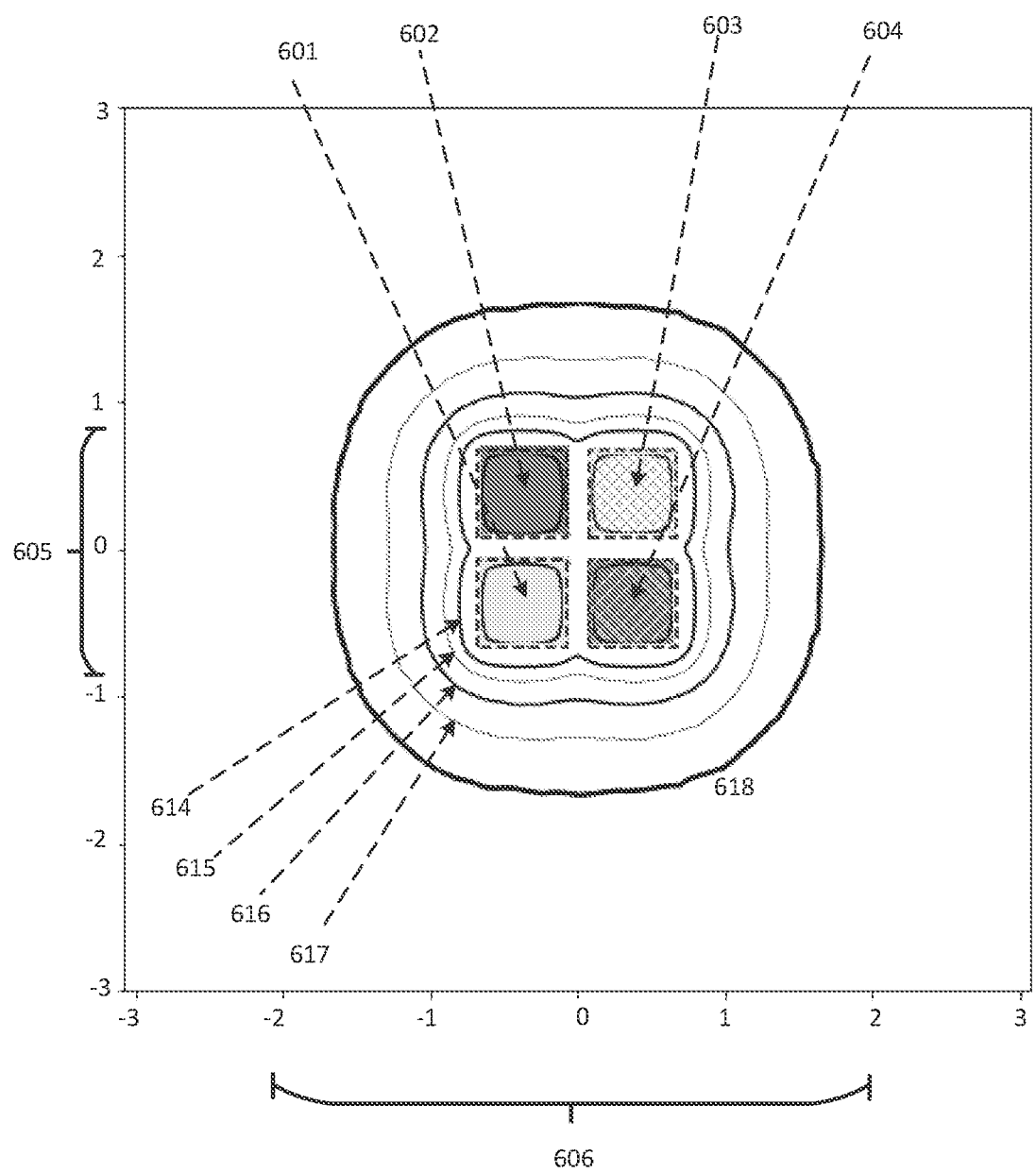
FIG. 6C illustrates the magnetic flux density created by a 2×2 cluster of four modular primary and secondary coil assembly duos paired diagonally during an out-of-phase charging session with each pair operating at a distinct frequency.

FIG. 6C illustrates a modular cluster of four primary coil assemblies arranged in a 2×2 cluster. In this example, the modular primary coil assemblies 601, 602, 603, and 604 are placed in a tessellation following a congruent rectilinear grid pattern.

In this embodiment, the primary coil assemblies are segregated into a diagonal first pair 601 and 603 and a diagonal second pair 602 and 604 with each pair powered from a separate source or individually powered, but with each pair sharing the same power levels with a set phase difference (e.g.)—180° between pair members. To compensate for a frequency offset in a secondary assembly (not shown), the first diagonal primary coil pair 601 and 603 is set to transmit at a different frequency than the second diagonal primary coil pair 602 and 604 during the out-of-phase charging session.

The first contour 614 shows the 100 µT constant magnetic flux density. The second contour 615 shows the 31.6 µT constant magnetic flux density. The third contour 616 shows the 10 µT constant magnetic flux density. The fourth contour 617 shows the 3.16 µT constant magnetic flux density. The fifth contour 618 shows the 1µT constant magnetic flux density.

The resultant pattern of magnetic flux density contours has a rounded square shape but still provides an advantage in flux density reduction over the nominal pattern and area shown in FIG. 6A. The shaping of the field pattern is also advantageous in that the reduction to the sides of the cluster and thus sides of the EV is pronounced.

FIG. 6D

Figure 6D:
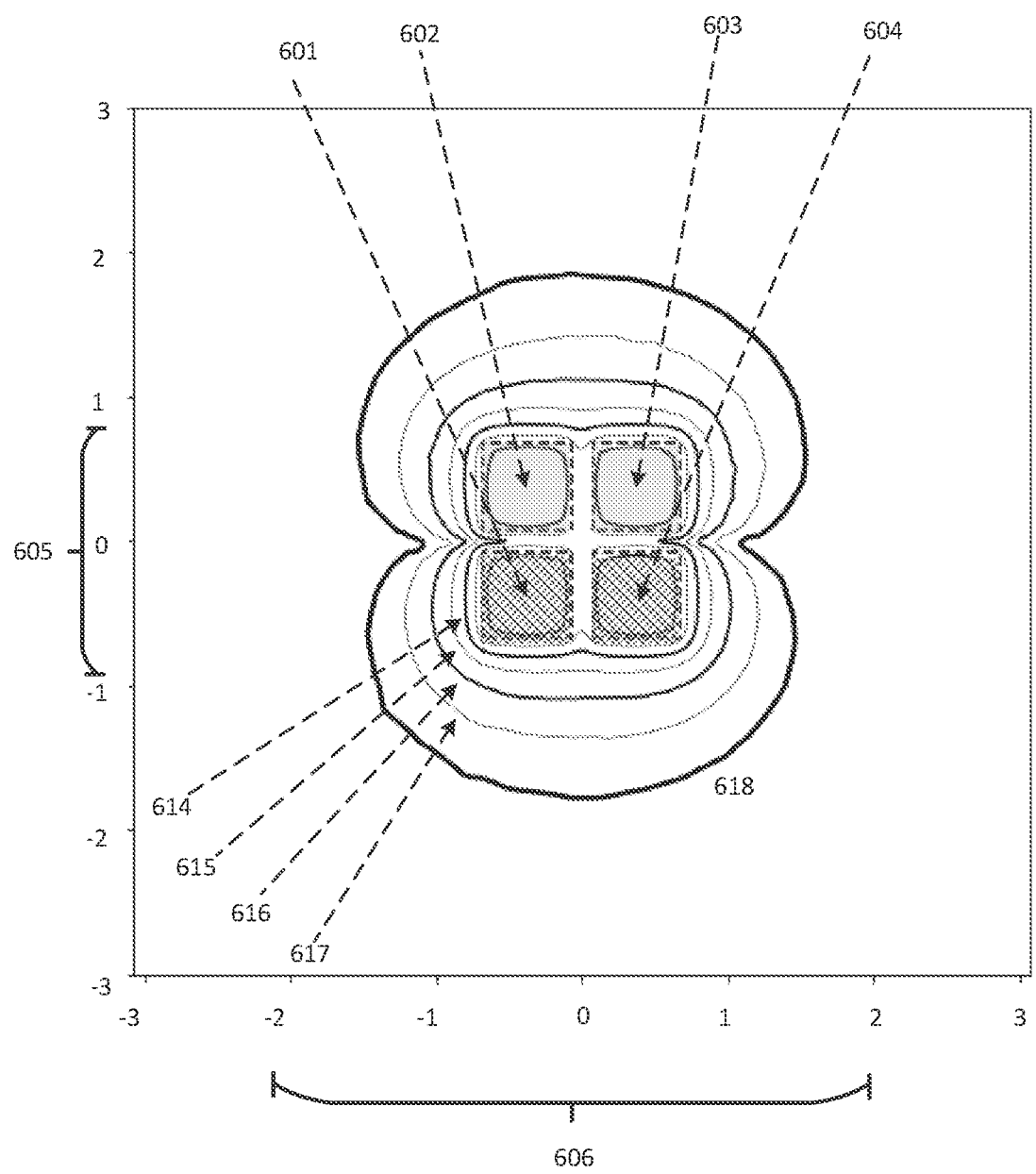
FIG. 6D illustrates the magnetic flux density created by a 2×2 cluster of four modular primary and secondary coil assembly duos paired side-by-side during an out-of-phase charging session. In this configuration, diagonal duos are out-of-phase.

FIG. 6D illustrates a modular cluster of four primary coil assemblies arranged in a 2×2 cluster. In this example, the modular primary coil assemblies 601, 602, 603, and 604 are placed in a tessellation following a congruent rectilinear grid pattern. However, this example, the primary coil assemblies are segregated into a side-by-side first pair 601 and 604 and a side-by-side second pair 602 and 603 with each pair powered from a separate source or individually powered, but with each pair sharing the same transmission frequency and power levels but with a set phase difference (e.g., 180°) between the side-by-side paired first and second primary coil assemblies during an out-of-phase charging session.

In FIG. 6D, the first contour 614 shows the 100 µT constant magnetic flux density. The second contour 615 shows the 31.6 µT constant magnetic flux density. The third contour 616 shows the 10 µT constant magnetic flux density. The fourth contour 617 shows the 3.16 µT constant magnetic flux density. The fifth contour 618 shows the 1µT constant magnetic flux density.

As can be seen in comparison with FIG. 6B (side-by-side pairing of out-of-phase primary coil assemblies) and FIG. 6C (diagonal pairing of out-of-phase primary coil assemblies), the side-by-side configuration does not reduce the magnetic flux density as well as the diagonal configuration does.

FIG. 7A

Figure 7A:
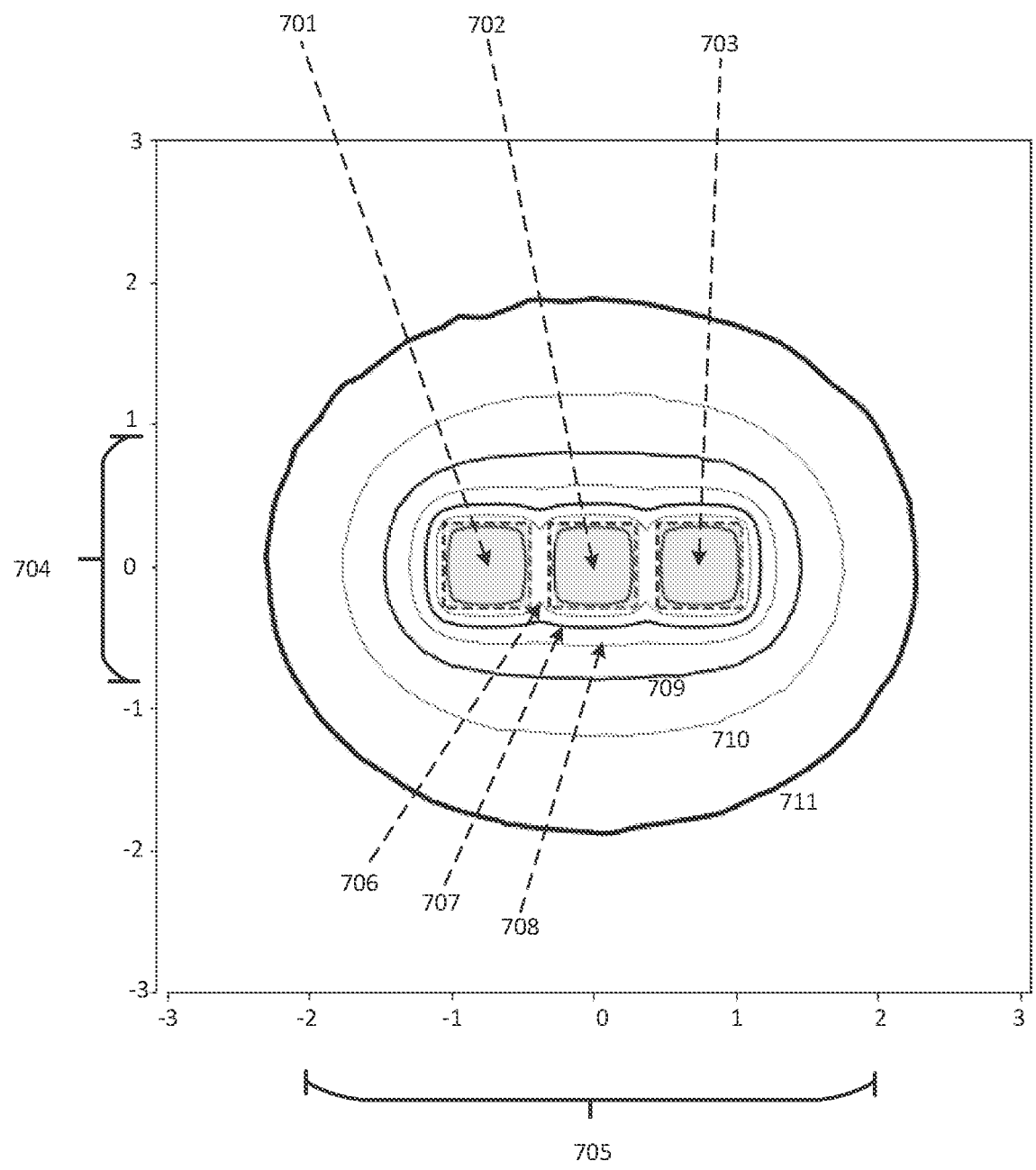
FIG. 7A illustrates the magnetic flux density created by a 1×3 inline cluster of three modular primary and secondary coil assembly duos during an in-phase charging session.

FIG. 7A illustrates a modular cluster of three primary coil assemblies arranged in a 1×3 cluster. This geometric arrangement is intended for installation under a van, truck, trailer, or bus chassis. In this example, the modular primary coil assemblies 701, 702, and 703 are placed in a tessellation following a congruent rectilinear grid pattern.

The additive magnetic flux density during an in-phase charging session is shown by the contours of constant magnetic flux density plotted on a Cartesian coordinate system with the origin placed at the center of the center primary coil assembly 702. The first contour 706 shows the 316 µT constant magnetic flux density. The second contour 707 shows the 100 µT constant magnetic flux density. The third contour 708 shows the 31.6 µT constant magnetic flux density. The fourth contour 709 shows the 10 µT constant magnetic flux density. The fifth contour 710 shows the 3.16 µT constant magnetic flux density. The sixth contour 711 shows the 1µT constant magnetic flux density.

The oval patterns of the contours of constant magnetic flux density are well suited for use in a WPT system where reduction in EMF produced is desired since arrangement of the cluster along the centerline of the EV produces maximum isolation and shielding of bystanders.

FIG. 7B

Figure 7B:
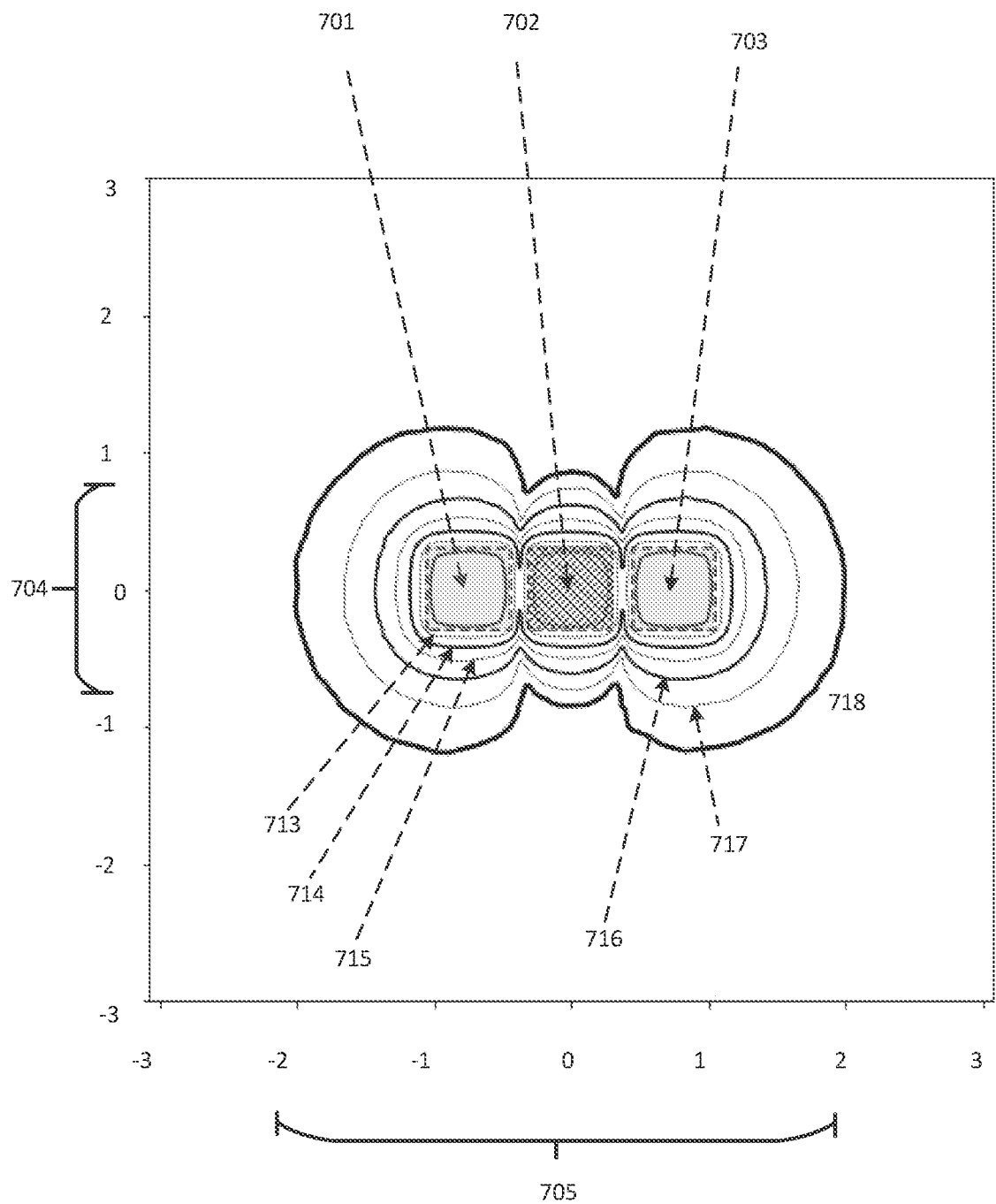
FIG. 7B illustrates the magnetic flux density created by a 1×3 inline cluster of three modular primary and secondary coil assembly duos during an out-of-phase charging session.

FIG. 7B illustrates a modular cluster of three primary coil assemblies arranged in a 1×3 cluster. Given the size of the individual primary coil assemblies, this geometric arrangement is well suited for installation under a van, truck, trailer, or bus chassis. In this example, the modular primary coil assemblies 701, 702, and 703 are placed in a row (the same tessellation following a congruent rectilinear grid pattern is used). The Cartesian plane is centered on the midpoint of the center primary coil assembly 702.

As discussed previously, the phase difference between paired primary coil assemblies results in destructive interference of the transmitted magnetic charging signals during an out-of-phase charging session. With three primary coil assemblies in the cluster, a modified version of pairing may be required. By setting the first primary coil assembly 701 and the third primary coil assembly 703 to transmit the same charging signal power, frequency, and phase, and then setting the middle primary coil assembly 702 to transmit a charging signal of the same power and frequency, but out of phase with first primary coil assembly 701 and the third primary coil assembly 703, a substantial reduction in the magnetic flux density can be achieved.

The additive magnetic flux density is shown by the contours of constant magnetic flux density plotted on a Cartesian coordinate system with the origin placed at the center of the center primary coil assembly 702. The first contour 713 shows the 316 µT constant magnetic flux density. The second contour 714 shows the 100 µT constant magnetic flux density. The third contour 715 shows the 31.6 µT constant magnetic flux density. The fourth contour 716 shows the 10 µT constant magnetic flux density. The fifth contour 717 shows the 3.16 µT constant magnetic flux density. The sixth contour 718 shows the 1µT constant magnetic flux density.

The reduction of the field as shown by the magnetic field contours versus the nominal FIG. 7A is substantial. The shaping of the field, where the contours are much reduced to the EV sides, is also advantageous.

FIG. 7C

Figure 7C:
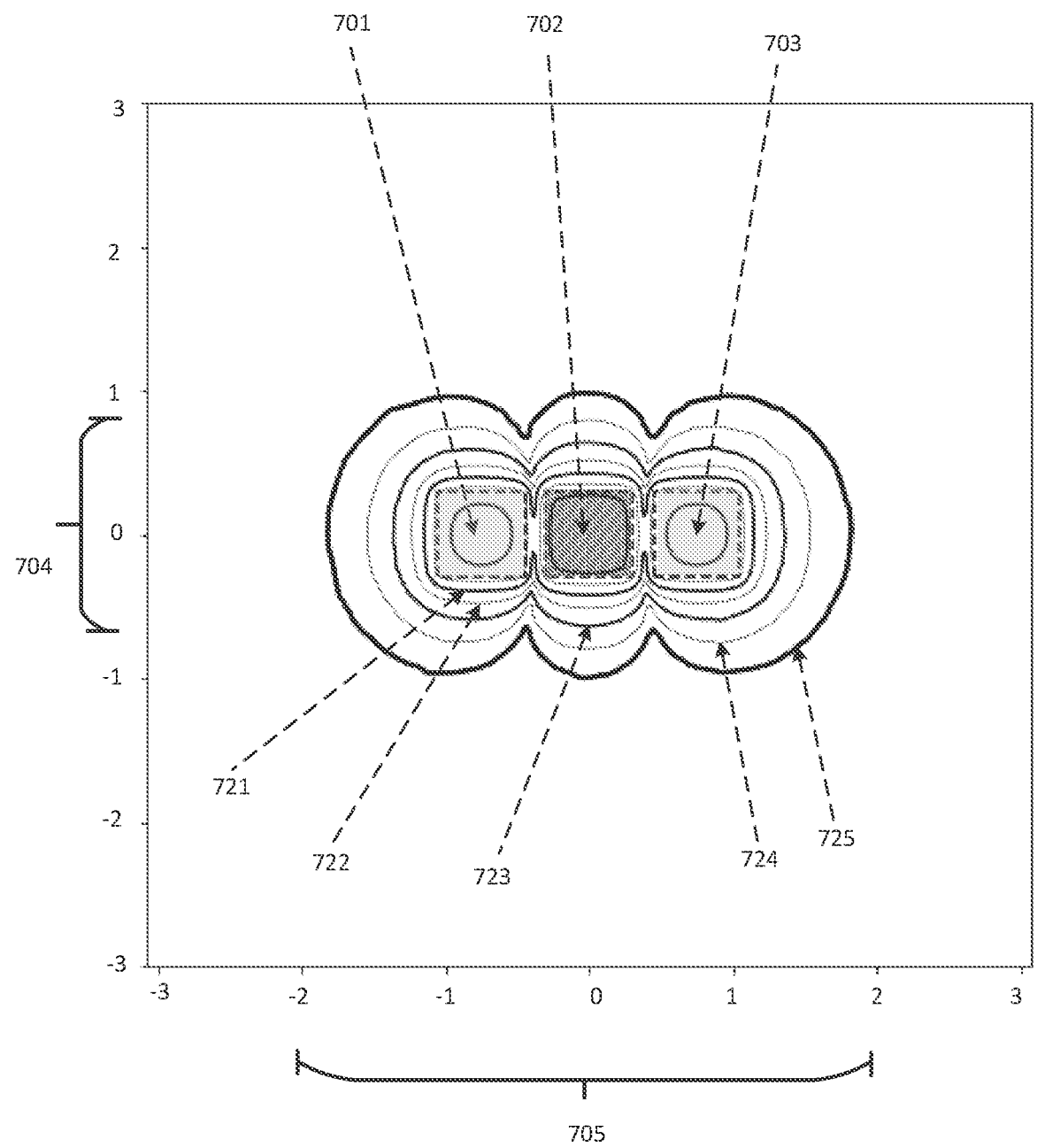
FIG. 7C illustrates the magnetic flux density created by a 1×3 inline cluster of three modular primary and secondary coil assembly duos during an out-of-phase charging session with power control.

FIG. 7C illustrates a modular cluster of three primary coil assemblies arranged in a 1×3 cluster. In this example, the modular primary coil assemblies 701, 702, and 703 are placed in a row (the same tessellation following a congruent rectilinear grid pattern is used). The Cartesian plane is centered on the midpoint of the center primary coil assembly 702.

In addition to the setting the first primary coil assembly 701 and the third primary coil assembly 703 to transmit the same charging signal power, frequency and phase, and then setting the middle primary coil assembly 702 to transmit a charging signal of the same frequency, but out-of-phase (e.g., 180°) with first primary coil assembly 701 and the third primary coil assembly 703, the power of the middle primary coil assembly 702 can be increased (alternately, the power of the charging signal for first primary coil assembly 701 and the third primary coil assembly 703 can be reduced) to create a greater reduction in the magnetic flux density than phase adjustment alone can achieve.

In this example of an out-of-phase charging session with power control, the outer primary coils 701 and 703 are set to carry 70% of the current of the middle primary coil 702. Power levels are thus 50% in the outer coils 701 and 703 and 50% in the middle coil 702. The first contour 721 shows the 100 µT constant magnetic flux density. The second contour 722 shows the 31.6 µT constant magnetic flux density. The third contour 723 shows the 10 µT constant magnetic flux density. The fourth contour 724 shows the 3.16 µT constant magnetic flux density. The fifth contour 725 shows the 1µT constant magnetic flux density.

The area of the magnetic field (as shown by the magnetic flux density contours) is reduced by the power control. Adjustments to the power control levels can further be used to shape the magnetic flux density to best fit the EV chassis shielding and exclusion area.

FIG. 7D

Figure 7D:
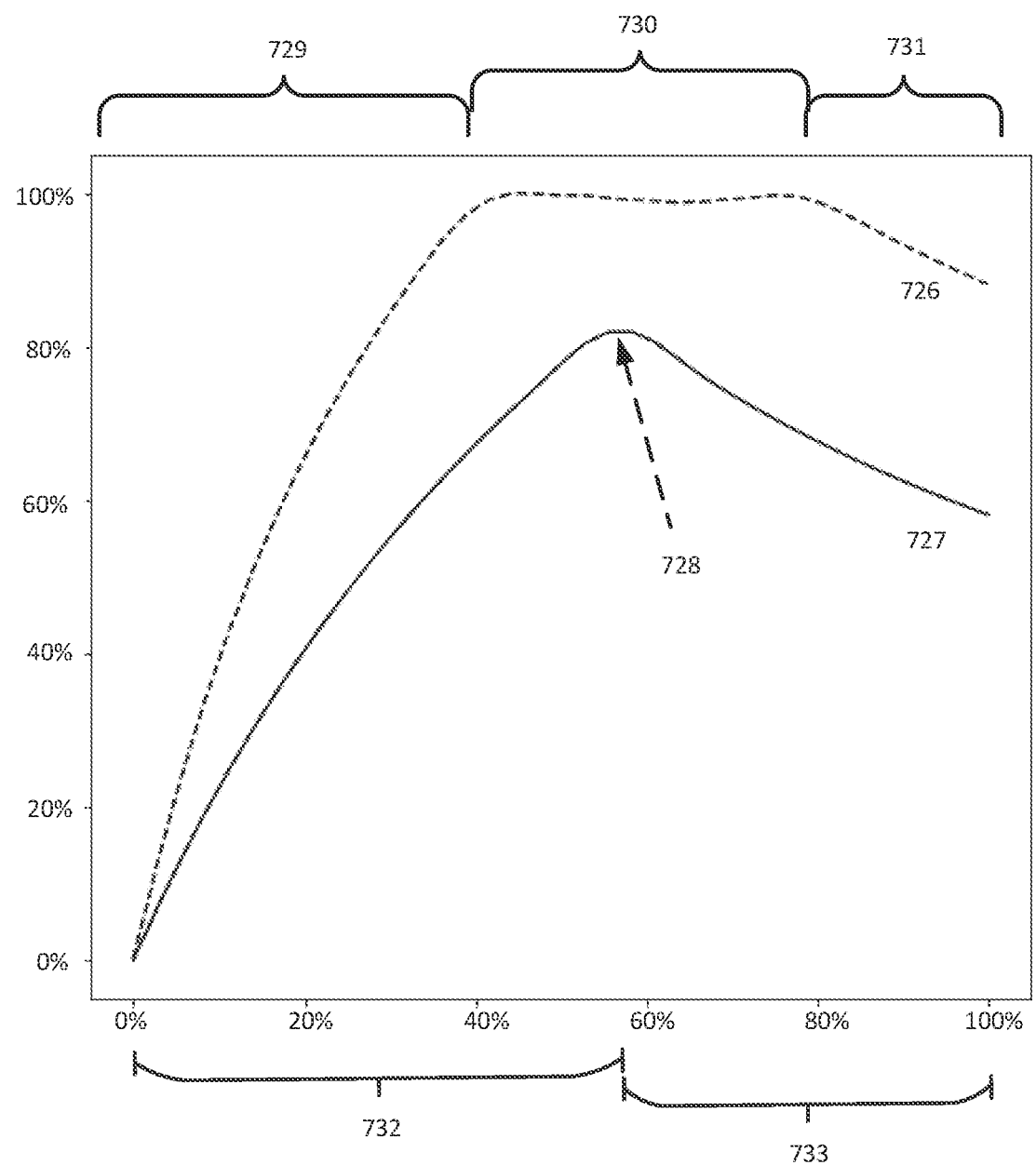
FIG. 7D illustrates the range of flux cancellation achievable in a 1×3 inline cluster of three modular primary and secondary coil assembly duos during an out-of-phase charging session with power control.

FIG. 7D illustrates the effective magnetic flux density reduction when using a 1×3 primary coil assembly cluster with virtual pairwise cancellation and power control during an out-of-phase charging session. The percentage of magnetic cancellation versus the current difference can be obtained when the current in the outer two coils is 180 degrees out of phase with the center coil and the outer coil current is varied as a proportion of center coil current. In FIG. 7D, the X-axis shows the current ratio (in percentage terms) between the inner and outer coil sets and the Y-axis shows the proportion of flux density cancelled when one coil set (e.g., the outer coils) carries current that is approximately 180 degrees out-of-phase with the current carried by the other set (e.g., the inner coil).

Curve 726 represents the maximum of the flux density cancellation achievable along a line beside the couplers corresponding to a typical vehicle edge (1.3 m). Curve 726 has three regions, 729, 730, and 731. In region 729, the current in the outer sets is too low to allow for maximum cancellation. In region 730, the current in the outer sets is at an appropriate level to allow for maximum cancellation. In region 731, the current in the outer sets is too high to allow for maximum cancellation. Operation in regions 730 or 731 confers benefits of reduced magnetic flux while tailoring power delivered to situational need.

Curve 727 represents the minimum (worst-case) of the flux density cancellation achievable along a line beside the couplers corresponding to a typical vehicle edge (1.3 m). Curve 727 has two regions 732 and 733, and one maximum at 728. In region 732, the minimum cancellation increases as current in the outer sets increases. In region 733, the minimum cancellation decreases as current in the outer sets increases. These regions surround a point where the minimum cancellation is at its greatest. Operation approximate this point ensures the most significant overall reduction in fields as it is also in region 730 for curve 726 which has the best maximum cancellation.

FIG. 8A

Figure 8A:
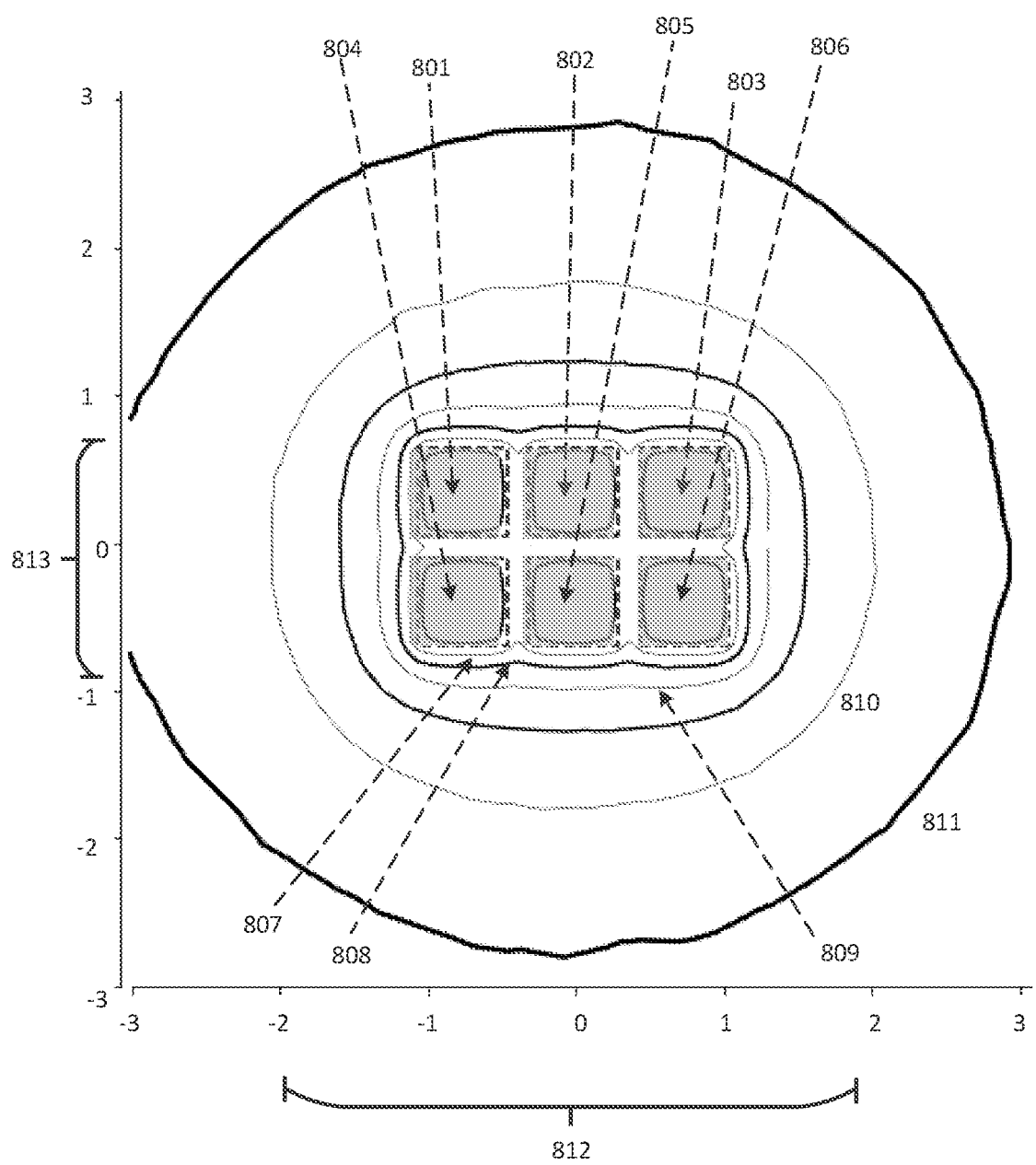
FIG. 8A illustrates the magnetic flux density created by a 2×3 cluster of six modular primary and secondary coil assembly duos during an in-phase charging session.

FIG. 8A illustrates a cluster of six modular primary coil assemblies arranged in a 2×3 cluster during an in-phase charging session. Given the size of the individual primary coil assemblies, this geometric arrangement is well suited for installation under larger vehicles such as a truck, a trailer, or a bus. In this example, the modular primary coil assemblies 801, 802, and 803 are placed in a first row and the modular primary coil assemblies 804, 805, and 806 are placed in a second row following the same tessellation in congruent rectilinear grid pattern. The Cartesian plane map is centered on the midpoint between the center pair of primary coil assemblies 802 and 805.

The first contour 807 shows the 316 µT constant magnetic flux density. The second contour 808 shows the 100 µT constant magnetic flux density. The third contour 809 shows the 31.6 µT constant magnetic flux density. The fourth contour 810 shows the 3.16 µT constant magnetic flux density. The fifth contour 811 shows the 1µT constant magnetic flux density.

FIG. 8B

Figure 8B:
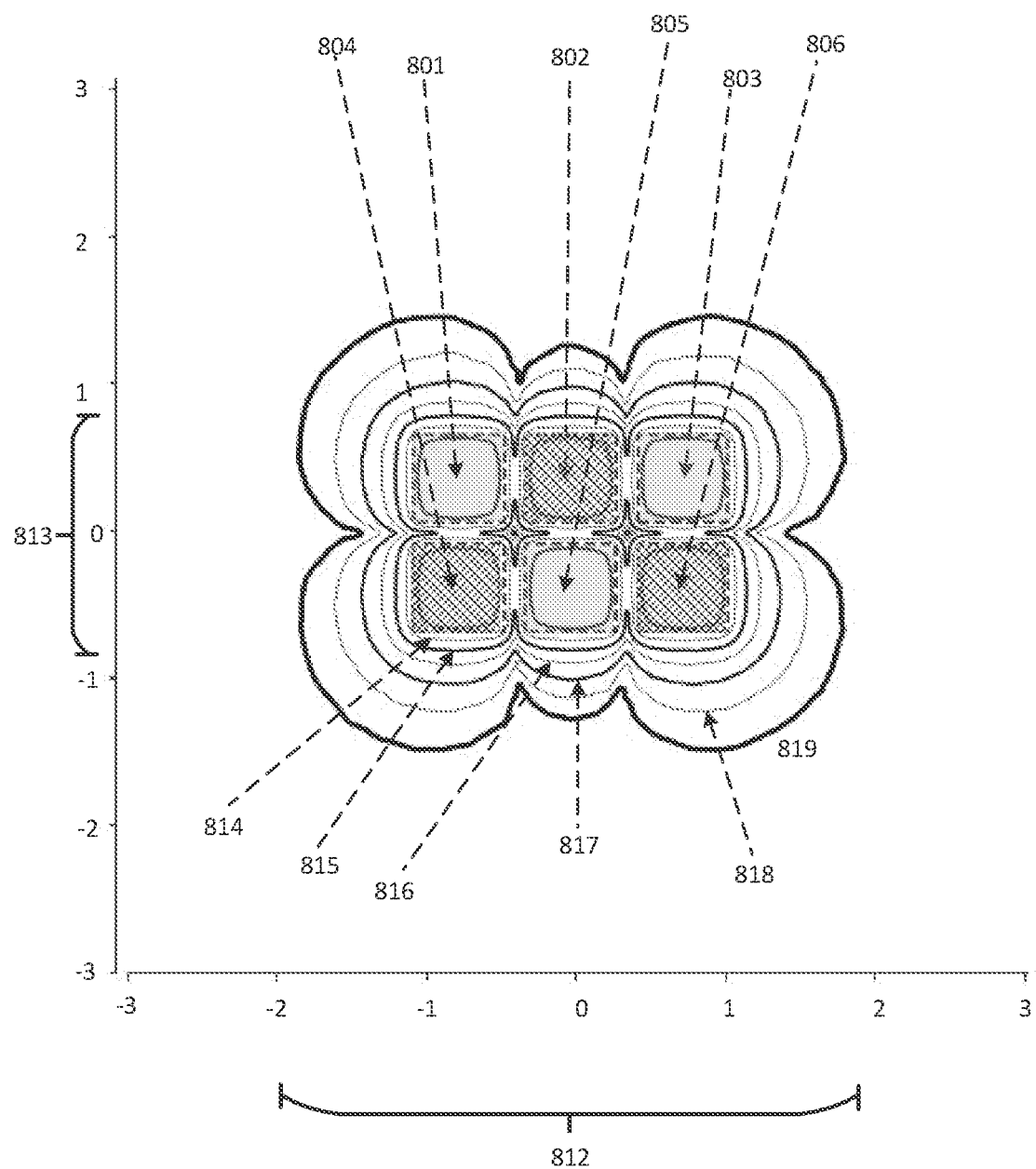
FIG. 8B illustrates the magnetic flux density created by a 2×3 cluster of six modular primary and secondary coil assembly duos during a during a diagonal pairwise out-of-phase charging session.

FIG. 8B illustrates a modular cluster of six primary coil assemblies arranged in a 2×3 cluster. This geometric arrangement is intended for installation under a larger truck, trailer, or bus chassis. In this example, the modular primary coil assemblies 801, 802, 803, 804, 805, and 806 are placed in a tessellation following a congruent rectilinear grid pattern of 2 rows by 3 columns (2×3) along the length of the vehicle.

In FIG. 8B, magnetic energy is transmitted both with offsets of both 0 degrees and 180 degrees phase shifts by the first pair 801 and 804, the second pair 802 and 805, and the third pair 803 and 806. This diagonal pattern allows each primary and secondary coil assembly duo to be neighbored only by duos of the opposite phase-offset during a charging session.

The additive magnetic flux density is shown by the contours of constant magnetic flux density plotted on a Cartesian coordinate system with the origin placed at the center of the cluster at the midpoint between primary coil assembly 802 and primary coil assembly 805. The first contour 814 shows the 316 µT constant magnetic flux density. The second contour 815 shows the 100 µT constant magnetic flux density. The third contour 816 shows the 31.6 µT constant magnetic flux density. The fourth contour 817 shows the 10 µT constant magnetic flux density. The fifth contour 818 shows the 3.16 µT constant magnetic flux density. The sixth contour 819 shows the 1µT constant magnetic flux density.

As can be seen by the contours, the magnetic flux density is substantially decreased at the 1 meter, 2 meter and 3 meter ranges versus the case where all six 6 primary coil assemblies are transmitting at the same phase (as shown in FIG. 8A). It is also noted that the shape of the magnetic field as described by the contours of magnetic flux density shown in FIG. 8B are substantially, favorably reduced directionally to the side. Assuming a deployment of secondary coil assemblies along the midline of the vehicle, the chassis of the vehicle would provide both shielding and human exclusion area of magnetic flux for this configuration.

FIG. 8C

Figure 8C:
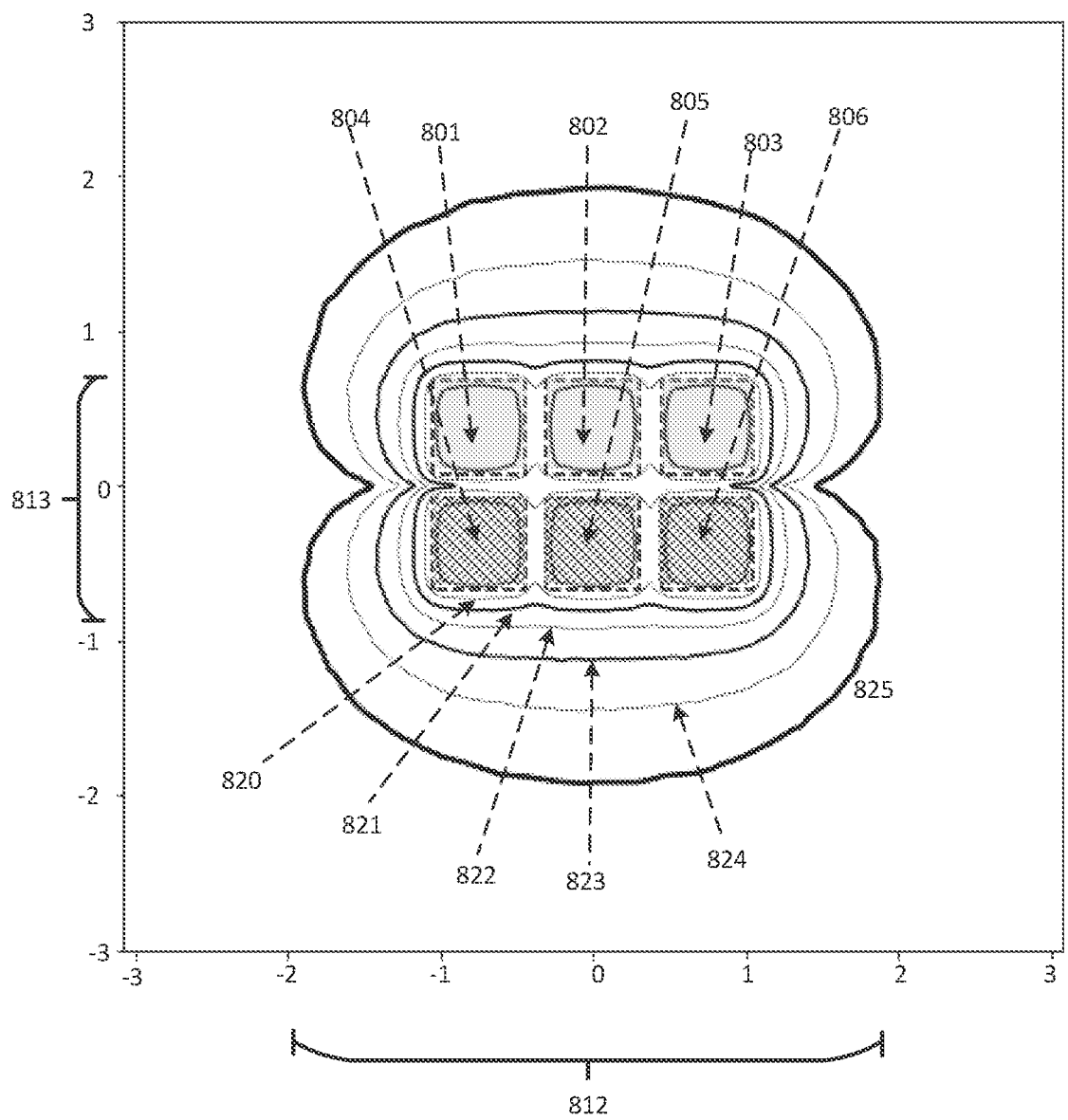
FIG. 8C illustrates the magnetic flux density created by a 2×3 cluster of six modular primary and secondary coil assembly duos during a side-by-side pairwise out-of-phase charging session.

In FIG. 8C, magnetic energy is transmitted both at 0 degrees and 180 degrees phase shifts by the first pair 801 and 804, the second pair 802 and 805, and the third pair 803 and 806 during a side-by-side pairwise out-of-phase charging session. This pattern sets up a side-to-side magnetic flux cancellation scheme.

The additive magnetic flux density is shown by the contours of constant magnetic flux density plotted on a Cartesian coordinate system with the origin placed at the center of the cluster at the midpoint between primary coil assembly 802 and primary coil assembly 805. The first contour 820 shows the 316 µT constant magnetic flux density. The second contour 821 shows the 100 µT constant magnetic flux density. The third contour 822 shows the 31.6 µT constant magnetic flux density. The fourth contour 823 shows the 10 µT constant magnetic flux density. The fifth contour 824 shows the 3.16 µT constant magnetic flux density. The sixth contour 825 shows the 1µT constant magnetic flux density.

The side-by-side pairwise cancellation results in equivalent magnetic flux density with both greater area and a less advantageous shaping. The increase in range of the equivalent magnetic flux density to the EV sides is contrary to the goal of reducing exposure to bystanders and entering or departing passengers.

FIG. 9

Figure 9:
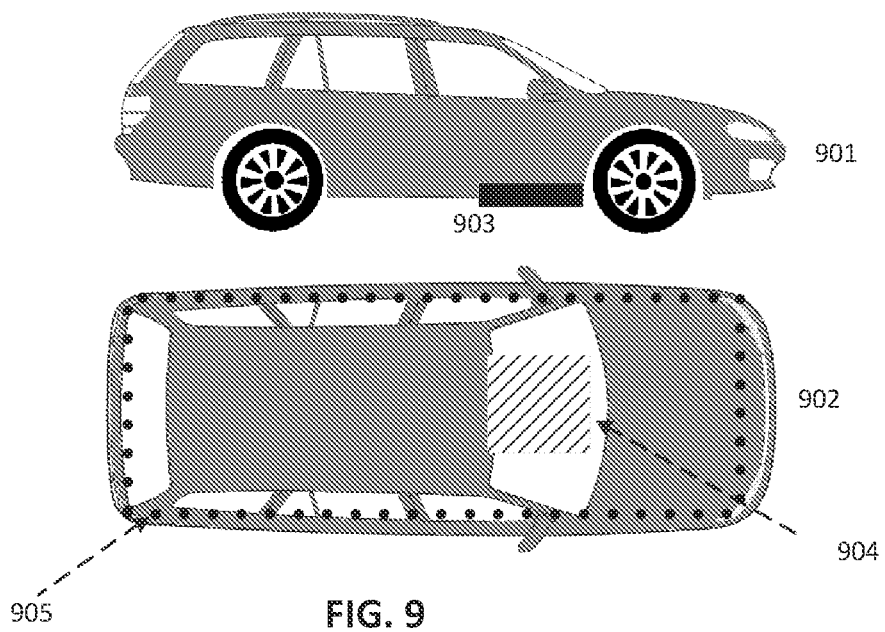
FIG. 9 illustrates exemplary placement of a single secondary coil assembly installation for a sedan type electric vehicle.

FIG. 9 illustrates two views of a generic electric or hybrid sedan of the type commonly used as a taxi. The side view 901 shows a sample single, vehicle mounted secondary coil assembly 903. The secondary coil assembly is also known as the receiver or vehicle assembly (VA).

The top see-through view 902 shows the placement of the secondary coil assembly 904 in the middle of the sedan chassis side-to-side and immediately behind the front wheels to lessen the chance of damage to the coil assembly from uneven road surfaces. The exclusion zone 905 shows the relatively inaccessible area created by the periphery of the vehicle's undercarriage. In sample embodiments, the magnetic field created while charging is advantageously shaped and limited to be predominately within the exclusion zone 905.

FIG. 10

Figure 10:
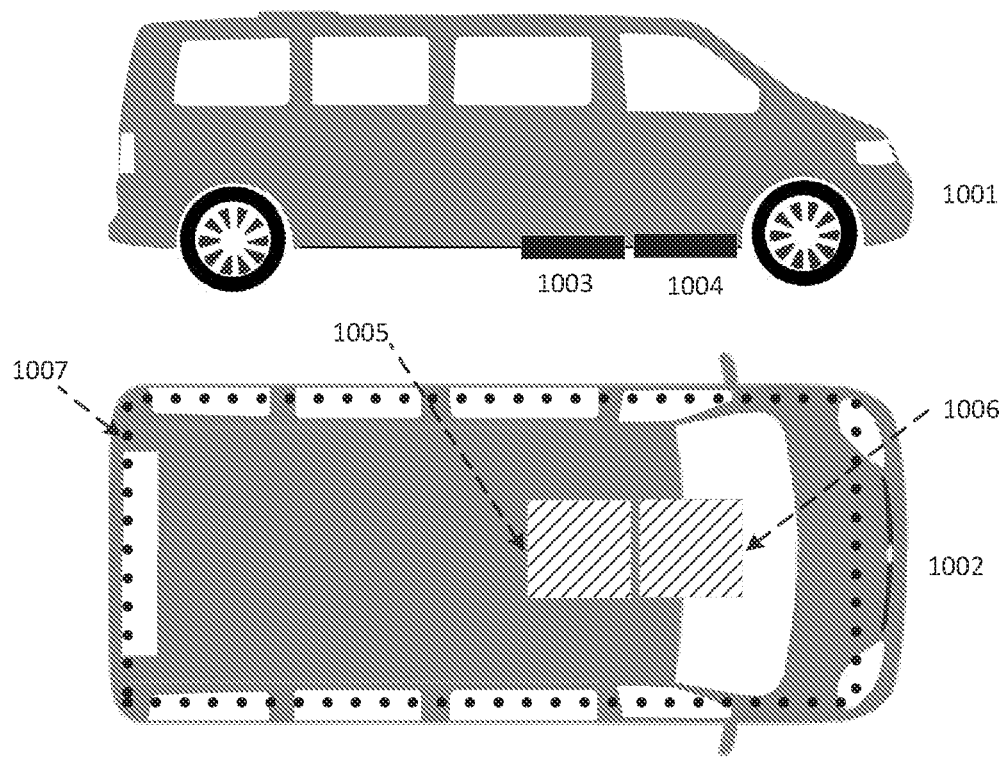
FIG. 10 illustrates exemplary placement of a single pair of secondary coil assembly installations for a van type electric vehicle.

FIG. 10 illustrates two views of a generic electric or hybrid van of the type commonly used as a transit vehicle. The side view 1001 illustrates a positioning option for the 1×2 pair of vehicle mounted secondary coil assemblies 1003 and 1004. The top see-through view 1002 shows a favorable position for mounting the first 1005 and second 1006 receiver along the mid-line of the chassis side to side and close behind the front wheels to lessen the chance of damage to the coil assemblies from uneven road surfaces. The exclusion zone 1007 shows the relatively inaccessible area created by the periphery of the vehicle's undercarriage. The magnetic field created while charging is advantageously shaped and limited to be predominately within the exclusion zone 1007.

FIG. 11

Figure 11:
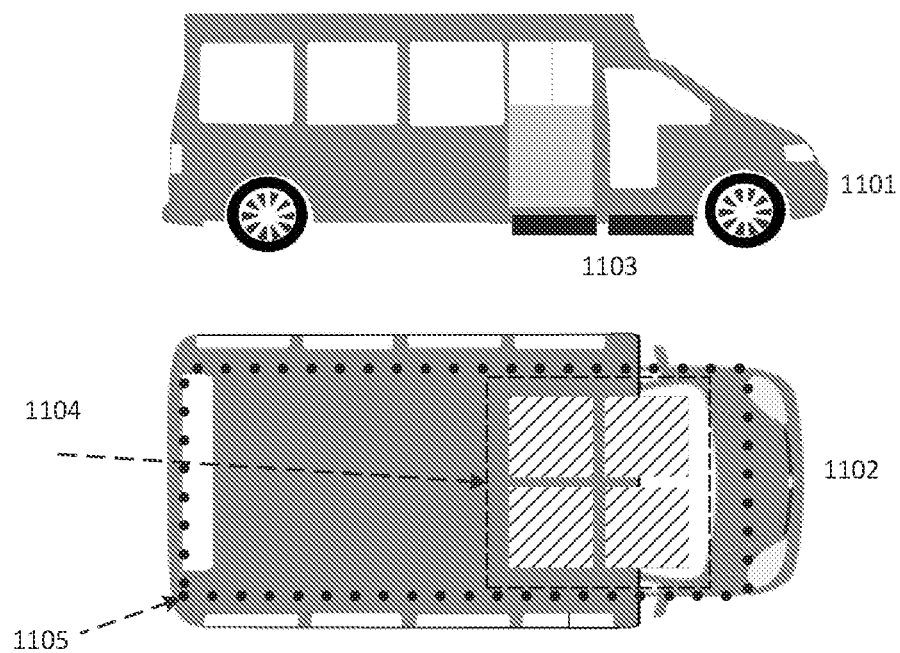
FIG. 11 illustrates exemplary placement of a cluster of three secondary coil assembly installations for a transit bus type electric vehicle.

FIG. 11 illustrates two views of a generic electric or hybrid transit bus. The side view 1101 illustrates a positioning option for a 2×2 cluster 1103 of vehicle mounted secondary coil assemblies. The top see-through view 1102 shows a favorable position for mounting the secondary cluster 1104 along the mid-line of the chassis side-to-side and close behind the front wheels to lessen the chance of damage to the coil assemblies from uneven road surfaces. The exclusion zone 1105 shows the relatively inaccessible area created by the periphery of the vehicle's undercarriage. The magnetic field created while charging is advantageously shaped and limited to be predominately within the exclusion zone 1105.

FIG. 12

Figure 12:
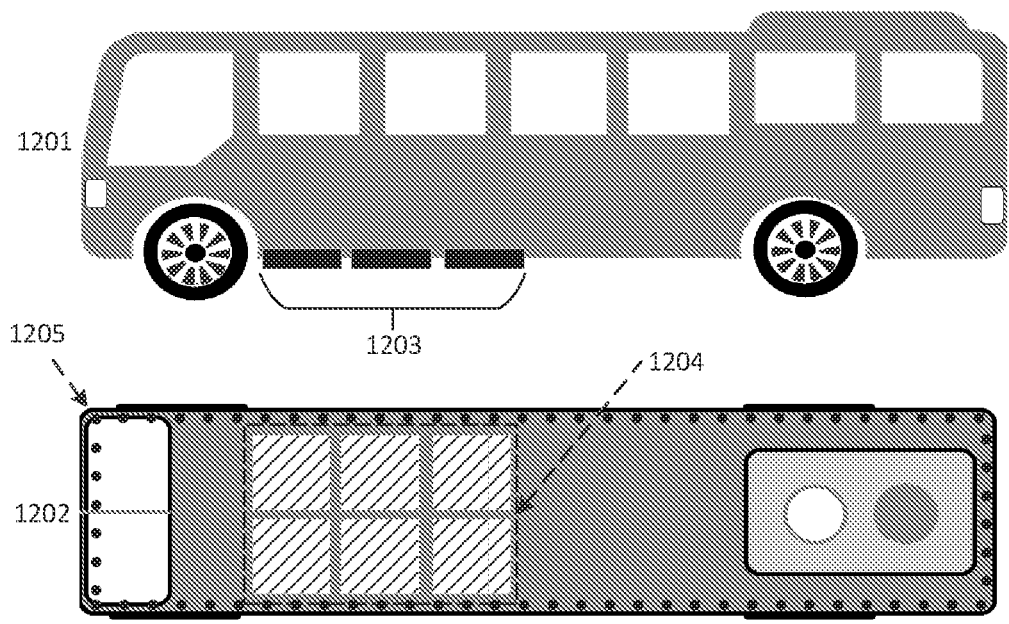
FIG. 12 illustrates exemplary placement of a cluster of six secondary coil assembly installations for commuter bus type electric vehicle.

FIG. 12 illustrates an example of a secondary or receiver cluster on a generic electric or hybrid bus in side 1201 and see-through top 1202 views. The side view 2101 illustrates a positioning option for a 2-by-3 (2×3) cluster 1203 of vehicle-mounted secondary coil assemblies. The top see-through view 1202 shows an exemplary position for mounting the example 2×3 secondary cluster 1204 along the mid-line of the underside of the bus chassis side-to-side and close behind the front wheels to lessen the chance of damage to the coil assemblies from uneven road surfaces. The exclusion zone 1205 shows the relatively inaccessible area created by the periphery of the vehicle's undercarriage. The magnetic field created while charging is advantageously shaped and limited to be predominately within the exclusion zone 1205. As noted above, only magnetic flux density below a threshold is allowable outside the exclusion zone.

FIGS. 9-12 illustrate the engineering trade-off between mechanical considerations (lessening the probability of damage from curbs, speed-bumps) with the use of the metallic chassis body as a magnetic shield to further reduce emissions. As the vehicle chassis varies and the number of modular secondary assemblies vary, the ability to shape the magnetic field (using destructive cancellation as tuned via the supplied power, frequency, phase, and secondary assembly layout) to minimize exposure to magnetic flux increases in utility.

In FIGS. 9-12, the exclusion zone perimeter is shown as coincident with the outline of the metallic vehicle body or undercarriage. In alternative embodiments, the exclusion zone may be a smaller portion or a larger expansion of the area outlined by the vehicle periphery and may include multiple areas corresponding to different levels of magnetic flux density. The smaller area may, for instance, be bounded by the sensor coverage of a foreign object detection (FOD) system or living object detection system (LOD). A larger area may be defined by a keep-away zone delineated by physical barriers or markings. A FOD or LOD system sensor coverage area may also be used to establish an exclusion zone larger than the vehicle outline. These smaller and larger exclusion zones may then be used for attaining a desirable shaping for the generated area of magnetic flux density above a threshold. Alternately, the shaping of the generated area of magnetic field may be used for adjustment of the exclusion area size and borders.

FIG. 13

Figure 13:
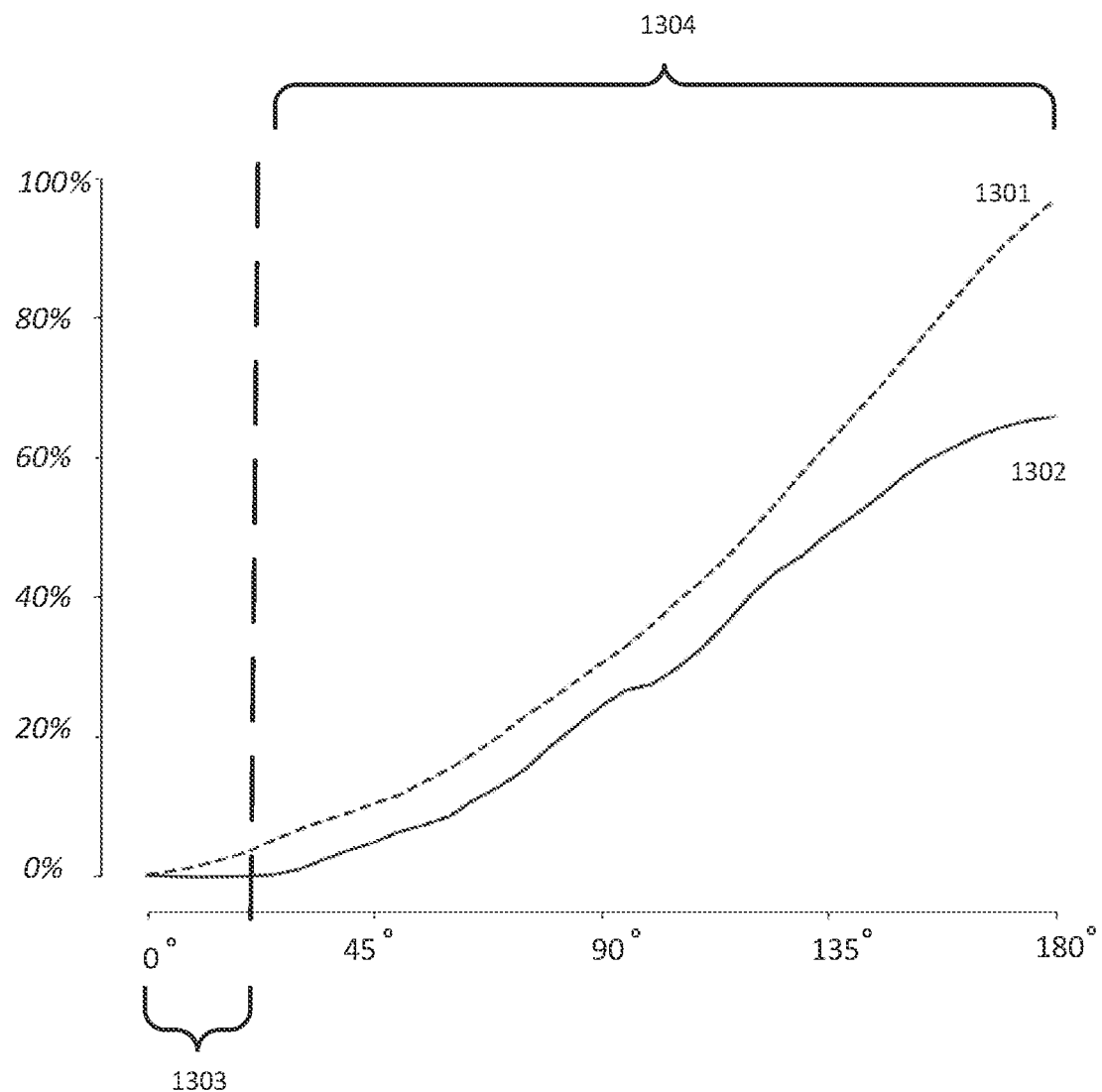
FIG. 13 illustrates a plot of the cancellation of magnetic flux versus diagonal pairwise phase differences for a 2×2 cluster of four primary and secondary coil assembly duos.

FIG. 13 illustrates a plot of the cancellation of magnetic flux density versus diagonal pairwise phase differences for a representative 2×2 cluster (4 primary and secondary coil assembly duos, paired diagonally as in FIG. 6B). The X-axis indicates the phase angle between the paired sets. The Y-axis indicates the amount of cancellation of flux density at 1.3 meters (corresponding to the edge of a typical transit or school bus) from the center of the cluster. The two lines 1301, 1302 indicate different magnitudes of flux density cancellation at different phase angles. The first line 1301 shows the maximum amount of flux density cancellation that can be achieved along the 1.3 m radius circle centered on the cluster. This maximum cancellation is generally along the axes of the grid formed by the 2×2 cluster. The second line 1302 shows the minimum amount of flux density cancellation that can be achieved along the 1.3 m radius circle centered on the cluster. This minimum cancellation is generally along the diagonals of the grid formed by the 2×2 cluster.

While all phase offsets show some cancellation for both the best 1301 and worst 1302 cases, the worst case 1302 line shows that in the first region 1303 which extends from 0 to 25 degrees of phase offset between coordinated primary assembly pairs, essentially no cancellation is achieved (<1%). Therefore, phase offsets in the second region 1304 extending from 25 degrees to 180 degrees are preferred.

FIG. 14

Figure 14:
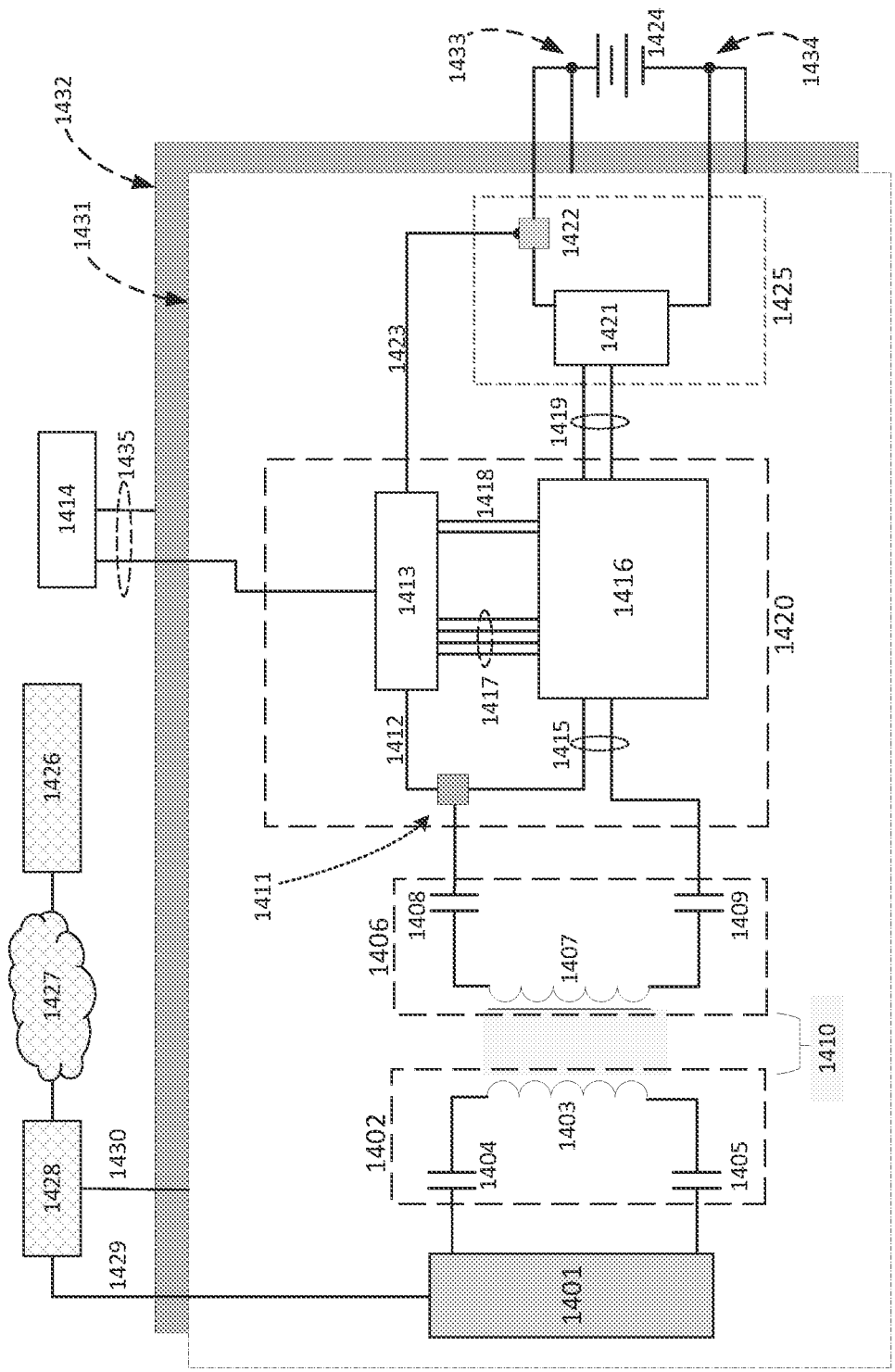
FIG. 14 illustrates the high-level component design for a wireless power transfer system in a sample embodiment.

FIG. 14 illustrates a high-power wireless power transfer system that may be adapted to incorporate the modular coil assemblies described herein for electrical vehicles with battery storage. Battery storage includes wet cell, dry cell, and solid-state batteries as well as capacitive storage and reversable fuel cells and combinations thereof (i.e., hybrid) energy storage.

In this system, the ground-side electronics 1401 provides a conditioned power signal to the primary coil assembly 1402. As preferred in high power systems, the primary coil assembly 1402 may have a balanced series-series configuration having primary coil windings 1403 and matched capacitors 1404 and 1405.

Across an air-gap 1410, the secondary coil assembly 1406 is used to receive the magnetic signal generated by the primary coil assembly 1402. The secondary coil assembly 1406 also may have the balanced series-series configuration with the secondary coil windings 1407 and matched capacitors 1408 and 1409. The AC power level, frequency, and phase (i.e., the AC signal data) generated by the secondary coil assembly 1406 is measured by a sensor 1411 that reports these measurements via digital datalink 1412 to the active rectifier controller (ARC) 1413. The ARC 1413 uses the AC signal data to predictively model the signal to determine zero crossings to optimize the active rectification. Rectification control signals are passed via control links 1417 to the active rectifier 1416 which takes the AC signal inputs 1415 and converts them to a DC power output 1419. Temperature sensors (now shown) in the rectifier module use digital datalinks 1418 to report to the ARC 1413. The power conditioner 1420 takes the DC output 1419 of the rectifier 1416 and removes ripple and noise at filter 1421 to charge the battery pack 1424. The conditioned DC signal characteristics are monitored by a sensor 1422 and reported back to the ARC 1413 via digital datalink 1423.

A landside data repository 1426, embodied as a single generic computer or cluster of computers and software database or constructed as a distributed embodiment with multiple geographically diverse sites each with computing resources and databases, may maintain charging profiles of default and historical measurements for each secondary coil assembly installed on a vehicle. The repository 1426 contains performance data, including frequency response and charging models, which can be requested over a data network 1427 by the charging site controller 1428 (a generic computer or computer cluster running site management software and database software) for setting charging session parameters when a vehicle is being charged.

These charging session parameters may include magnetic signal characteristics for each primary coil assembly or primary coil assembly pair (e.g. instantaneous power level during charging session, base signal frequency, frequency drift, signal phase offset, and nominal coil-to-coil gap) based on the aligned secondary coil (or pairs of aligned primary and secondary) and local conditions such as power availability, environmental factors (e.g. temperature) and installed primary coil assembly conditions (e.g. internal temperature(s), usage factors, number of coils per primary, number of turns per primary, surface mounted or flush mounted primary coil assembly(s)).

The charging session parameters may also include the charger profile of the primary coil assembly or primary coil assembly pair of the type illustrated in Table 1:

TABLE 1

| Charger Profile | |
| --- | --- |
| Primary coil identifiers | Flush mount or raised mount |
| Number of Turns per Primary coil | Make, model, manufacturer |

TABLE 1-continued

| Charger Profile | |
|---|---|
| Autonomous Alignment capability | Min./Max. current and voltage support |
| Communications protocols available | Communications bandwidth |

Automotive charging related data may also be stored in the data repository 1426. This data may include battery aging information (e.g., charging-time versus battery charge state for one or more charging sessions) as well as the siting of the secondary coil assemblies on the chassis, and the EM shielding provided by the EV body.

Table 2 below provides a sample vehicle charging profile that may be stored in the data repository 1426 and/or stored on the vehicle side and communicated to the ground side charger during charging.

TABLE 2

| Vehicle Charging Profile | |
|---|---|
| Per secondary coil frequency offset | Secondary Make, model, manufacturer |
| Number of Secondary Coil Assemblies | Positioning of Secondary Coil Assemblies |
| BMS Make, model, manufacturer | Min./Max. current and voltage support |
| Health status per Secondary Coil Assembly(s) | Temperature limitations |
| Temperature readings | Cooling availably |

Access to the vehicle charging profile and near real-time data gives the WPT, via the charging site controller 1428, the ability to reconfigure each primary coil at session initiation and during charging session based on data from the primary coil assembly sensors, as well as feedback from secondary and/or load across the air gap 1410 via the inductive communications system (not shown).

Access to the charging site controller 1428 is via digital datalink 1429 1430 with each first primary and secondary coil assemblies 1431 and second primary and secondary coil assemblies 1432 having access to the same profile information. The current developed by each primary and secondary coil assembly 1431 1432 in the charging point is combined at the positive battery terminal 1433 and negative battery terminal 1434 and used to charge the vehicle battery pack 1424.

The first ARC 1413 and second ARC (not shown) reports both AC and DC power characteristics to a networked controller 1414 for storage and reporting via digital datalinks 1435.

FIG. 15

Figure 15:
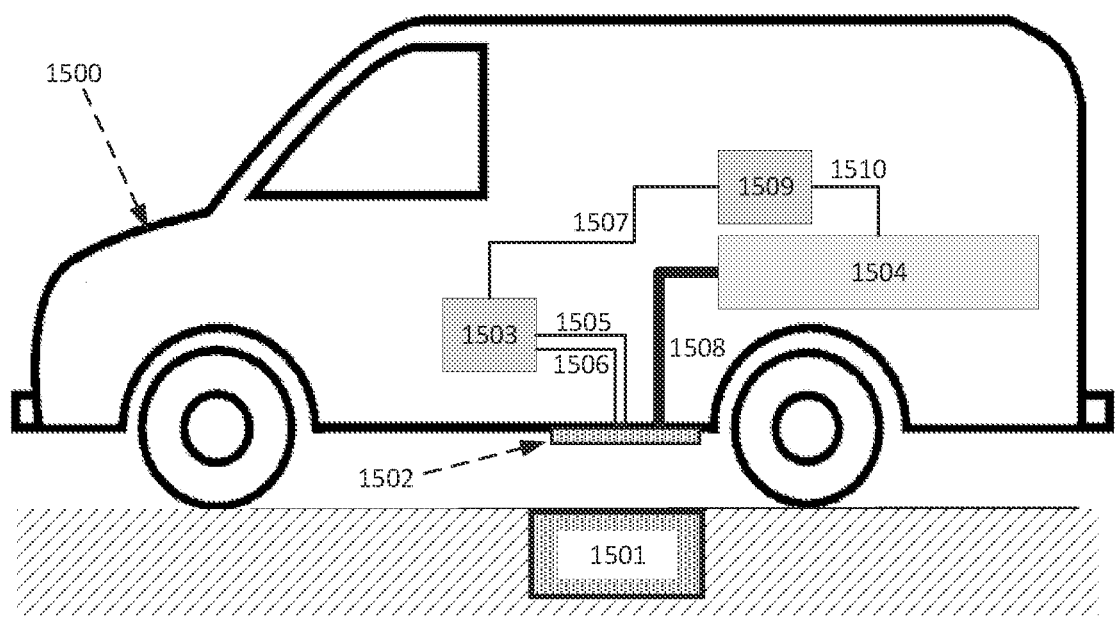
FIG. 15 diagrammatically illustrates the subsystems of an electric vehicle involved in a wireless charging session.

FIG. 15 illustrates, at a high level, the electric vehicle systems involved with automatic wireless charging in sample embodiments. As illustrated, the electric vehicle 1500 is equipped with a secondary vehicle coil assembly 1502 (in this case a single coil unit) that receives wireless charging from a primary ground coil assembly 1501. The Battery Management System (BMS) 1509 is responsible for monitoring and management of the battery pack 1504. Note that the term "battery pack" is used herein to depict a generic chemical energy storage system and could be replaced, supplemented, or hybridized with other portable energy storage systems (e.g., solid-state battery arrays, reversable fuel cells, ultra-capacitors). Based on algorithms, the BMS 1509 manages performance and maximizes range and longevity by setting charge rates and balancing individual cell (or cell bank) charging/discharging while monitoring charge levels and temperatures.

The BMS 1509 controls the charging session (and associated logistics, billing, and sensor reading) with messaging sent via the downlink datalink 1505 and uplink datalink 1506 supported by the inductive communications transceiver system provided by the secondary assembly 1502. A data store of the BMS 1509 includes identity and authorization information, battery voltage, and a maximum current level setting. The BMS 1509 may, optionally, contain a local version or subset of the magnetic charging data profile for the vehicle and installed secondary assembles. The wireless charging controller 1503 functions to translate and bridge the vehicle network and the inductive communications transceiver system via data link 1507. The BMS 1509 receives sensor data from the battery pack 1504 sent via wired or wireless datalink 1510, which may be, for example, implemented over a Controller Area Network (CAN) bus.

The secondary vehicle coil assembly 1502 delivers direct current to the battery pack 1504 via a high-current bus 1508. In cases where the battery pack 1504 is fully charged, current also may be diverted or shared with onboard systems of vehicle 1500, such as communications, entertainment, and environmental control while in the queue and aligned and in communications with the charge point's maximum current level setting.

FIG. 16

Figure 16:
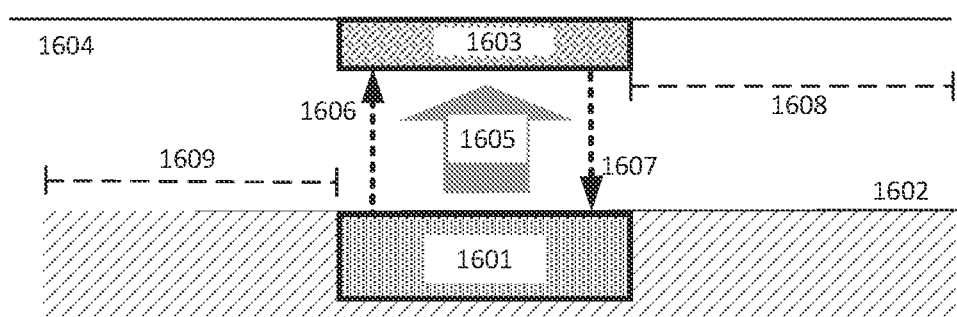
FIG. 16 illustrates the over-the-air signaling for an inductively coupled wireless charging session.

FIG. 16 illustrates the wireless charging signals and ranges used in automatic wireless charging at a single charge point in sample embodiments. For automatic charging, the ground primary assembly 1601, shown here as embedded to be flush with the surface of the pavement 1602, is substantially aligned and in communication with the vehicle secondary assembly 1603 during charging. In this example, the secondary assembly 1603 is mounted on the underside of the vehicle chassis 1604.

Before the charging signal 1605 can be initiated, an uplink 1606 and downlink 1607 data path are established using inductive communication links using communication devices as described, for example, in U.S. Pat. No. 10,135, 496, incorporated herein by reference. The inductive links 1606 and 1607 are power limited with approach range 1608 and departure range 1609 barely exceeding the size of the primary ground coil assembly 1601 (approximately 500 millimeters). Additional information on the alignment process can be found in U.S. Pat. No. 10,814,729, entitled "Method and apparatus for the alignment of a vehicle and charging coil prior to wireless charging;" U.S. Pat. No. 10,193,400 entitled "Method of and apparatus for detecting coil alignment error in wireless inductive power transmission;" and U.S. Pat. No. 10,040,360 entitled "Method and apparatus for the alignment of vehicles prior to wireless charging including a transmission line that leaks a signal for alignment," the contents of which are incorporated herein by reference. Other embodiments with alternative short range local area wireless networking technologies (e.g., Bluetooth, Zigbee, Wi-Fi) or longer range Wireless wide area network (WWAN) technologies (e.g., cellular technology such as LTE, Connected-Car wireless packet data systems, Vehicle-to-Infrastructure (V2I), Vehicle-to-Everything (V2X)) may be used.

FIG. 17

Figure 17:
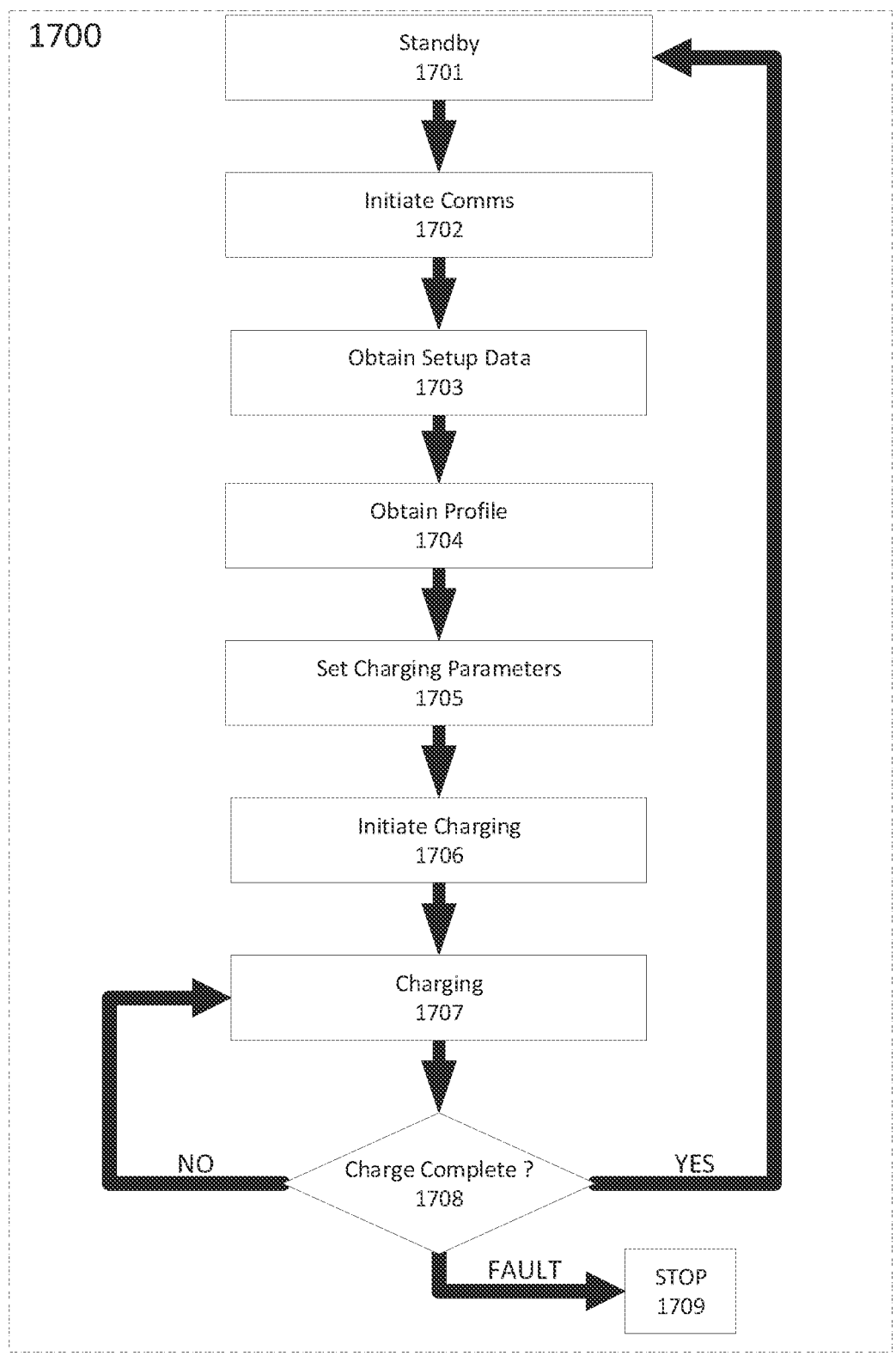
FIG. 17 shows a method of charging an electric vehicle in a sample embodiment.

FIG. 17 is a flowchart illustrating a method 1700 of charging an electric vehicle in a sample embodiment. In the illustrated example, the charging point is in Standby state 1701 until bi-directional communications are initiated. The charging point may, while in the standby state, emit an inductive communications beacon. Alternately, the charging point may only begin to emit a beacon when the charging site controller 1428 commands it due to reception of arrival information via a radio communications system (e.g., Wireless Local Area Network (WLAN) or a Wide Area Radio Communication System (e.g., cellular packet radio systems)) or another vehicle detection mechanism indicating that the electric vehicle is approaching the charging point.

Bi-directional communications are started in the Initiate Comms state 1702. To enter Initiate Comms state 1702, a bi-directional communications link is set up, and authentication and authorization to charge are established. While the Initiate Comms state 1702 may be entered prior to alignment of the primary coil assembly(s) with the secondary coil assembly(s) and the Obtain Setup Data 1703 may begin once a reliable bi-directional link is assured, the Obtain Profile state 1704 will not commence until after alignment is complete.

Once bi-directional communications are initiated and established (and thus the presence of the EV to be charged is assured), charging session setup data can pass between the EV's computer systems and landside authentication, authorization, and payment services. Either as part of this Obtain Setup Data state 1703 or as part of a discrete Obtain Profile state 1704, details about the EV's inductive charging capabilities are obtained. The Obtain Setup Data state 1703 may also include details on the vehicle's charging power-level requested.

The EV's charging profile can be obtained in several ways, based on the election of the EV designer and operator. In one instance, the EV's computer systems (e.g., the Battery Management System (BMS), or Automated Driving System (ADS)) contain the charging profile for download. In another instance, the charging profile is downloaded from a landside data repository using the EV information obtained early in the Obtain Setup Data state 1703. Alternately, a general EV make-model-manufacturer charging profile may be used (obtained from the EV, landside repository, or local cache) or a default charging profile based on the number and layout of the EV secondary coil assemblies discovered can be used if no charging profile or EV make-model-manufacturer information is available.

Once the charging profile is obtained in the Obtain Profile state 1704, the Set Charging Parameters state 1705 is entered. In the Set Charging Parameters state 1705, the charging signal for each primary coil assembly is set in terms of frequency, amplitude, and phase. The parameters for the charging signal are set to a charging signal having a magnetic field that is predominately within the exclusion zone based on the obtained magnetics profile and the requested charging power level.

The charging point turns on the charging signal at the start of the Initiate Charging state 1706. Once charging is started, the Charging state 1707 is maintained until it is determined at 1708 that charging is completed or otherwise terminated. A normal completion event includes ending of the session by the EV (e.g., battery full), termination by the session by the charging site controller 1428 (e.g., pre-payment authorization level met) or by the primary or secondary coil assemblies (e.g., detection the EV has driven off the charging point). After any normal charging session completion event, the charging point state reverts to Standby state 1701. An abnormal session termination event (e.g., overheating detected) is considered a fault and results in immediate termination of the charging session 1707 with the charging point set in a STOP state 1709 until the fault has been resolved.

Additional Embodiments

Bi-Directional

Since only the tightly coupled power-transferring coils are involved, bi-directional power transfer at reduced total magnetic flux is enabled for either direction using the phase, frequency, and power control previously described. The bi-directional power transfer may require the addition of DC to AC conversion on the vehicle as well as AC-DC-AC or AC/AC conversion on the ground side to supply the local AC grid.

Mix and Match

With control over the inductive communications link and the frequency, power-level, and phase of the charging signal at each primary coil assembly, arbitrarily large grids can be constructed. For each charging session, a unique pattern of primary coil assemblies can be selected to send power. In one example, a 3×3 grid of primary coil assemblies is constructed. Using the vehicle profile to determine the number and placement of secondaries on the EV, the EV can be maneuvered by the driver or automated piloting via lane indicators or communication signals sent to the EV so that a set of primary coil assemblies will be aligned with the EV's secondary coil assemblies. The 3×3 example would be capable of charging vehicles with 3×3 arrays of secondary coil assemblies, as well as those with 1×1, 1×2, 1×3, and 2×3 arrays where the appropriate subset of the 3×3 coil assembly on the ground side is activated.

In certain cases, EVs can be charged from primary coil assemblies with smaller arrays. For example, a 1×2 primary array could be used to charge an EV equipped 2×3 secondary array where the two primary coil assemblies align with two of the six secondary coil assemblies.

In cases where an EV has one or more secondary coil assemblies is inoperative, a charging station can charge the EV using only those primary coil assemblies that align to functional secondary coil assemblies.

In each circumstance, and optionally based on the magnetic charging profile of the EV, the frequency, phase, and power of the charging signal generated by the primary coil assemblies can be adjusted to limit magnetic emissions.

Wide Area Balancing

The ability to control frequency, phase, and power for each of the modular primary coil assemblies not only in a single charge point (a cluster of primary coil assemblies serving a single vehicle), but also for closely spaced deployments of multiple charge points (e.g., in a depot, parking lot, traffic queue or railyard).

A mapping of the maximum magnetic field (e.g., the magnetic flux density) can be created from sensor readings at deployment or by modeling. A model can be created or augmented using a real-time local sensor array of 1 or more discrete antennas that can be used to measure aggregate magnetic flux density originating from charge points or other associated electrical equipment.

The 3-dimensional aggregate magnetic flux density is calculated by a processor or obtained via sensors that have processing capabilities so as to function as means for identifying any additive 'hot spots' of magnetic flux densities. A series of best case, worst case models can be generated by the identifying means. Similarly, ground level and head level models can be generated by the identifying means.

The power, phase, and frequency offsets then may be used to rebalance magnetic charging signals to reduce or eliminate any areas of magnetic flux densities above a desired safety/exposure threshold (e.g., an operator defined fraction of the FCC Part 15, Part 18, IEEE C.95 or ICNRIP thresholds).

FIG. 18

Figure 18:
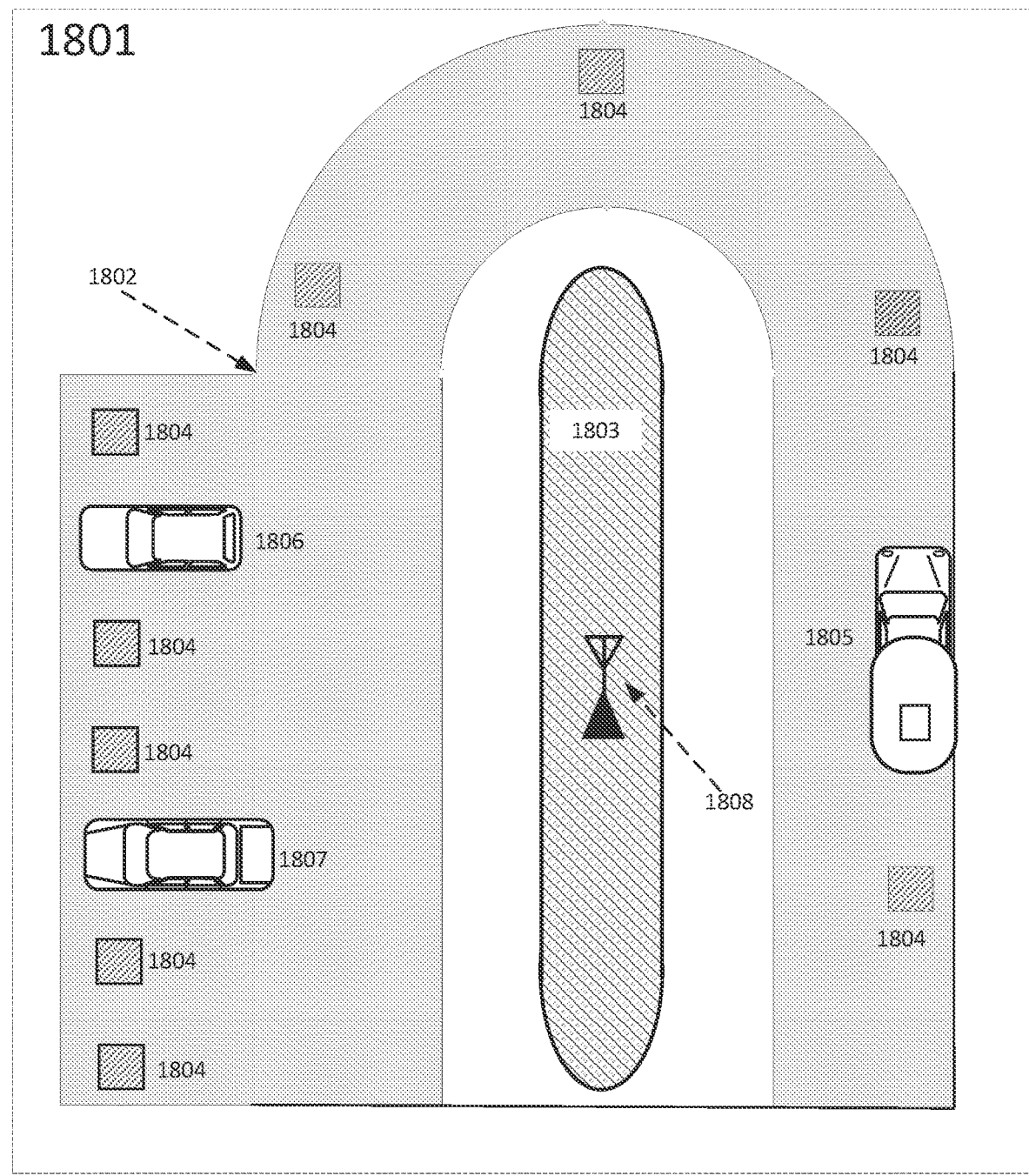
FIG. 18 graphically illustrates a charging station equipped with wide area magnetic flux management in a sample embodiment.

FIG. 18 graphically illustrates a charging station equipped with wide area magnetic flux management in a sample embodiment. The embodiment of FIG. 18 provides magnetic field balancing through coordination of multiple modular wireless charging points. The charging station 1801 includes a paved area 1802 and landscaping areas 1803. The landscaping areas 1803 can contain the power supplies (not shown) needed for powering the wireless charging points and can by installation of berms, wire barriers, and walls help segregate and contain magnetic flux generated by the charge points 1804 when in operation. Occupied charge points 1805, 1806, and 1807 generate magnetic flux while the inoperative charge points 1804 are quiescent. To minimize areas of additive magnetic flux density, predetermined models can be applied to adjust the phase of the in-operation charging points 1805, 1806, and 1807. One or more magnetic antenna 1808 may be deployed to augment, monitor, or supplement the wide-area magnetic flux mitigation scheme through destructive interference as described herein. In this embodiment, a single, centrally located monitoring antenna station 1808 is shown. Multiple antenna stations may be deployed as means to monitor the perimeter of the charging station, at known additive hot spots, or in areas with unprotected pedestrian traffic and to provide destructive interference signals as needed. The antenna stations may provide signals to the respective coil assemblies for adjusting the power, phase, and/or frequency offsets of the coil assemblies in a vicinity of the additive hot spot of magnetic flux densities to balance charging signals from the respective coil assemblies to reduce magnetic flux densities at the additive hot spot of magnetic flux densities.

CONCLUSION

Those skilled in the art will appreciate that the topology and circuit implementation methodology described herein enable magnetic flux density to be controlled in accordance with the dimensions and characteristics of the vehicle on which the coil assembly is mounted.

The examples and figures used are descriptive of clusters of geometrically symmetric primary and secondary coil assemblies with coils of each arranged in the same plane. Use of the same sizes and co-planar coil deployments were used for ease of descriptions. Non-symmetric coils, non-rectilinear grid placements and non-co-planar deployments can use the principles and techniques described herein to manage production of magnetic field but with potentially lower performance.

While various implementations have been described above, it should be understood that they have been presented by way of example only, and not limitation. For example, any of the elements associated with the systems and methods described above may employ any of the desired functionality set forth hereinabove. Thus, the breadth and scope of a preferred implementation should not be limited by any of the above-described sample implementations.

As discussed herein, the logic, commands, or instructions that implement aspects of the methods described herein may be provided in a computing system including any number of form factors for the computing system such as desktop or notebook personal computers, mobile devices such as tablets, netbooks, and smartphones, client terminals and server-hosted machine instances, and the like. Another embodiment discussed herein includes the incorporation of the techniques discussed herein into other forms, including into other forms of programmed logic, hardware configurations, or specialized components or modules, including an apparatus with respective means to perform the functions of such techniques. The respective algorithms used to implement the functions of such techniques may include a sequence of some or all of the electronic operations described herein, or other aspects depicted in the accompanying drawings and detailed description below. Such systems and computer-readable media including instructions for implementing the methods described herein also constitute sample embodiments.

The monitoring and control functions of the active rectifier controller 1413, the vehicle's current charging site controller 1428, and/or vehicle charging controller 1414 described herein may be implemented in software in one embodiment. The software may consist of computer executable instructions stored on computer readable media or computer readable storage device such as one or more non-transitory memories or other type of hardware-based storage devices, either local or networked. Further, such functions correspond to modules, which may be software, hardware, firmware, or any combination thereof. Multiple functions may be performed in one or more modules as desired, and the embodiments described are merely examples. The software may be executed on a digital signal processor, ASIC, microprocessor, or other type of processor operating on a computer system, such as a personal computer, server, or other computer system, turning such computer system into a specifically programmed machine.

Examples, as described herein, may include, or may operate on, processors, logic, or a number of components, modules, or mechanisms (herein "modules"). Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. The software, when executed by the underlying hardware of the module, causes the hardware to perform the specified operations.

Accordingly, the term "module" is understood to encompass a tangible hardware and/or software entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

Those skilled in the art will appreciate that while the disclosure contained herein pertains to the provision of electrical power to vehicles, it should be understood that this is only one of many possible applications, and other embodiments including non-vehicular applications are possible. For example, those skilled in the art will appreciate that there are numerous non-vehicle inductive charging applications such as portable consumer electronic device chargers, such as those (e.g., PowerMat™) used to charge toothbrushes, cellular telephones, and other devices. Accordingly, these and other such applications are included within the scope of the following claims.

What is claimed is:

1. A method of charging an electric vehicle, comprising:
a charging point and the electric vehicle initiating communications with each other, the charging point subject to at least one of a human or electronics exposure limit during charging;
the charging point receiving setup data from the electric vehicle for setting up the charging point for charging of the electric vehicle, the setup data including at least one of a manufacturer of the electric vehicle or a model of the electric vehicle, and an exclusion zone of the electric vehicle where a near field magnetic flux density within the exclusion zone is permitted to exceed the at least one human or electronics exposure limit during charging, the exclusion zone including an area outside a perimeter of at least one electric vehicle coil assembly adapted for wireless power transfer but inside a periphery of the electric vehicle; and
the charging point activating ground primary coils and associated power levels for the activated ground primary coils based on the setup data to create a charging signal having a magnetic flux density that remains below the at least one human or electronics exposure limit outside of the exclusion zone of the electric vehicle.

2. The method of claim 1, further comprising using at least one of the manufacturer or model of the electric vehicle to look up in a database which ground primary coils to activate and power levels for the activated ground primary coils for charging of the electric vehicle.

3. The method of claim 1, wherein the charging point activates the ground primary coils according to a determined layout of secondary coils of the electric vehicle as determined from the received setup data.

4. The method of claim 1, wherein the charging point adjusts parameters of the charging signal based on the setup data as needed to fit a magnetic flux generated by the charging signal that exceeds the at least one human or electronics exposure limit within the exclusion zone of the electric vehicle.

5. The method of claim 1, wherein the charging point and the electric vehicle initiating communications with each other comprises the charging point emitting an inductive communications beacon while in a standby state and receiving a response from the electric vehicle to establish that the electric vehicle is approaching the charging point.

6. The method of claim 1, wherein the charging point and the electric vehicle initiating communications with each other comprises the charging point receiving arrival information for the electric vehicle via a communications system or a vehicle detection system indicating that the electric vehicle is approaching the charging point and the charging point emitting a beacon upon receipt of the arrival information for the electric vehicle.

7. The method of claim 1, wherein the charging point and the electric vehicle initiating communications with each other comprises establishing a bi-directional communications link between the charging point and the electric vehicle and establishing authentication of the electric vehicle and authorization to charge the electric vehicle prior to alignment of the electric vehicle with ground primary coils at the charging point.

8. The method of claim 7, further comprising the charging point receiving charging session setup data from the electric vehicle, the charging session setup data comprising information about at least one of the electric vehicle's inductive charging capabilities or the electric vehicle's charging power level.

9. The method of claim 7, further comprising obtaining a charging profile of the electric vehicle from at least one of the electric vehicle or from a data repository using identification of the electric vehicle from the charging session setup data.

10. The method of claim 7, further comprising obtaining a default charging profile of the electric vehicle based on a number and layout of coil assemblies of the electric vehicle.

11. The method of claim 1, further comprising bi-directionally transferring power between the activated ground primary coils and secondary coils of the electric vehicle.

12. The method of claim 1, wherein the charging point activating ground primary coils and associated power levels for the activated ground primary coils based on the setup data to create a charging signal having a magnetic flux density that remains below the at least one human or electronics exposure limit outside of the exclusion zone of the electric vehicle comprises selecting a pattern of primary coil assemblies to send power to the electric vehicle for a charging session, wherein the selected pattern of primary coil assemblies corresponds to a pattern of secondary coil assemblies of the electric vehicle.

13. The method of claim 1, further comprising mapping a maximum magnetic field originating from each charging point of a plurality of localized charging points to identify an additive hot spot of magnetic flux densities and adjusting at least one of power, phase, or frequency offsets of at least one ground assembly of a charging point in a vicinity of the additive hot spot of magnetic flux densities to rebalance magnetic flux densities in the vicinity of the additive hot spot of magnetic flux densities whereby the magnetic flux densities in the vicinity of the additive hot spot remain within a safety threshold.

14. The method of claim 13, wherein rebalancing the magnetic flux densities in the vicinity of the additive hot spot comprises applying at least one predetermined model to adjust a phase of operating charging points in the vicinity of the additive hot spot.

15. The method of claim 13, wherein rebalancing the magnetic flux densities in the vicinity of the additive hot spot comprises deploying at least one magnetic antenna to provide signals to respective ground assemblies of charging points in the vicinity of the additive hot spot to at least one of augment, monitor, or supplement the magnetic flux densities in the vicinity of the additive hot spot through destructive interference.

16. An electric vehicle charging system comprising:
a plurality of coil arrays, each coil array comprising at least one coil assembly that generates a charging signal at a set frequency, wherein the charging signal is subject to at least one of a human or electronics exposure limit during charging;

a communications system that communicates with an electric vehicle to receive setup data from the electric vehicle for setting up the coil arrays for charging of the electric vehicle, the setup data including at least one of a manufacturer of the electric vehicle or a model of the electric vehicle, and an exclusion zone of the electric vehicle where a near field magnetic flux density within the exclusion zone is permitted to exceed the at least one human or electronics exposure limit during charging, the exclusion zone including an area outside a perimeter of at least one electric vehicle coil assembly adapted for wireless power transfer but inside a periphery of the electric vehicle; and a controller that activates one or more coil arrays and sets power levels for activated coil arrays based on the setup data to create a charging signal having a magnetic flux density that remains below the at least one human or electronics exposure limit outside of the exclusion zone of the electric vehicle.

17. The charging system of claim 16, wherein the controller uses at least one of the manufacturer or model of the electric vehicle to look up in a database which of the one or more coil arrays to activate.

18. The charging system of claim 16, wherein the controller uses at least one of the manufacturer or model of the electric vehicle to look up in a database power levels for activated coil arrays for charging of the electric vehicle.

19. The charging system of claim 16, wherein the controller activates the one or more coil arrays according to a determined layout of secondary coils of the electric vehicle as determined from the received setup data.

20. The charging system of claim 16, wherein the controller adjusts parameters of the charging signal based on the setup data as needed to fit a magnetic flux generated by the charging signal that exceeds the at least one human or electronics exposure limit within the exclusion zone of the electric vehicle.

21. The charging system of claim 16, wherein the communications system initiates communications with the electric vehicle by emitting an inductive communications beacon while in a standby state and receives a response from the electric vehicle to establish that the electric vehicle is approaching the charging point.

22. The charging system of claim 16, wherein the communications system receives arrival information for the electric vehicle and emits a beacon upon receipt of the arrival information for the electric vehicle to initiate communications with the electric vehicle.

23. The charging system of claim 16, wherein the communications system establishes a bi-directional communications link with the electric vehicle and the controller establishes authentication of the electric vehicle and authorization to charge the electric vehicle prior to alignment of the electric vehicle with one or more of the coil arrays.

24. The charging system of claim 23, wherein the controller receives charging session setup data from the electric vehicle, the charging session setup data comprising information about at least one of the electric vehicle's inductive charging capabilities or the electric vehicle's charging power level.

25. The charging system of claim 23, wherein the controller receives a charging profile of the electric vehicle from at least one of the electric vehicle or from a data repository using identification of the electric vehicle from the charging session setup data.

26. The charging system of claim 23, wherein the controller receives a default charging profile of the electric vehicle based on a number and layout of coil assemblies of the electric vehicle.

27. The charging system of claim 16, wherein the one or more coil arrays bi-directionally transfer power with secondary coils of the electric vehicle.

28. The charging system of claim 16, wherein the controller selects a pattern of coil arrays to send power to the electric vehicle for a charging session, wherein the selected pattern of coil arrays corresponds to a pattern of secondary coil assemblies of the electric vehicle.

29. The charging system of claim 16, further comprising:
at least one sensor that measures aggregate magnetic flux generated by charging signals generated by respective coil arrays; and
means for identifying an additive hot spot of magnetic flux densities and for adjusting at least one of power, phase, or frequency offsets of at least one of the coil arrays in a vicinity of the additive hot spot of magnetic flux densities to reduce magnetic flux densities at the additive hot spot of magnetic flux densities.

30. The charging system of claim 29, wherein the means for identifying the additive hot spot of magnetic flux maps a maximum magnetic field originating from a plurality of clusters of coil arrays to identify an additive hot spot of magnetic flux densities and adjusts at least one of power, phase, or frequency offsets of at least one cluster of coil arrays in a vicinity of the additive hot spot of magnetic flux densities to rebalance magnetic flux densities in the vicinity of the additive hot spot of magnetic flux densities whereby the magnetic flux densities in the vicinity of the additive hot spot remain within a safety threshold.

31. The charging system of claim 29, wherein the means for identifying the additive hot spot of magnetic flux rebalances the magnetic flux densities in the vicinity of the additive hot spot by applying at least one predetermined model to adjust a phase of operating coil arrays in the vicinity of the additive hot spot.

32. The charging system of claim 29, further comprising at least one magnetic antenna in the vicinity of the additive hot spot, wherein the means for identifying the additive hot spot of magnetic flux rebalances the magnetic flux densities in the vicinity of the additive hot spot by providing signals via the at least one magnetic antenna to respective coil arrays in the vicinity of the additive hot spot to at least one of augment, monitor, or supplement the magnetic flux densities in the vicinity of the additive hot spot through destructive interference.

* * * * *